(12) United States Patent  (10) Patent No.: US 11,562,840 B2
Kataoka et al.  (45) Date of Patent: Jan. 24, 2023

(54) GRAIN-ORIENTED ELECTRICAL STEEL SHEET AND METHOD FOR PRODUCING GRAIN-ORIENTED ELECTRICAL STEEL SHEET

(71) Applicant: NIPPON STEEL CORPORATION, Tokyo (JP)

(72) Inventors: Takashi Kataoka, Tokyo (JP); Ichiro Tanaka, Tokyo (JP); Haruhiko Atsumi, Tokyo (JP); Kazutoshi Takeda, Tokyo (JP); Hirotoshi Tada, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 317 days.

(21) Appl. No.: 16/978,155

(22) PCT Filed: Mar. 22, 2019

(86) PCT No.: PCT/JP2019/012269
§ 371 (c)(1),
(2) Date: Sep. 3, 2020

(87) PCT Pub. No.: WO2019/182154
PCT Pub. Date: Sep. 26, 2019

(65) Prior Publication Data
US 2021/0043345 A1 Feb. 11, 2021

(30) Foreign Application Priority Data
Mar. 22, 2018 (JP) .............................. JP2018-054678

(51) Int. Cl.
*C21D 9/46* (2006.01)
*H01F 1/147* (2006.01)
(Continued)

(52) U.S. Cl.
CPC ............. *H01F 1/147* (2013.01); *C21D 6/005* (2013.01); *C21D 6/008* (2013.01); *C21D 8/1222* (2013.01);
(Continued)

(58) Field of Classification Search
CPC ....................................... C21D 9/46
See application file for complete search history.

(56) References Cited

U.S. PATENT DOCUMENTS 5,411,604 A 5/1995 Inokuti et al.
2015/0010762 A1 1/2015 Yamaguchi et al.
(Continued)

FOREIGN PATENT DOCUMENTS

JP 4-5524 A 1/1992
JP 5-335128 A 12/1993
(Continued)

OTHER PUBLICATIONS

"Methods of measurement of the magnetic properties of magnetic steel sheet and strip by means of a single sheet tester", JIS C 2556, (1996), total of 6 pages.
(Continued)

*Primary Examiner* — Jophy S. Koshy
(74) *Attorney, Agent, or Firm* — Birch, Stewart, Kolasch & Birch, LLP

(57) ABSTRACT

A grain-oriented electrical steel sheet includes: a base steel sheet having a predetermined chemical composition; a glass coating provided on the surface of the base steel sheet; and a tension-applying insulation coating provided on the surface of the glass coating, in which linear thermal strains having, a predetermined angle (φ) with respect to a transverse direction which is a direction orthogonal to a rolling direction are periodically formed on the surface of the tension-applying insulation coating at predetermined inter-
(Continued)

vals along the rolling direction, a full width at half maximum F1 on the linear thermal strain and a full width at half maximum F2 at an intermediate position between the two linear thermal strains adjacent to each other satisfy $0.00 < (F1-F2)/F2 \leq 0.15$, the width of the linear thermal strain is 10 μm or more and 300 μm or less, and in the base steel sheet, an orientation distribution angle γ around a rolling direction axis of secondary recrystallization grains, an orientation distribution angle α around an axis parallel to a normal direction, and an orientation distribution angle β around an axis perpendicular to each of the RD axis and the ND axis in units of ° satisfy $1.0 \leq \gamma \leq 8.0$ and $0.0 \leq (\alpha^2+\beta^2)^{0.5} \leq 10.0$.

12 Claims, 5 Drawing Sheets

(51) Int. Cl.
| | |
|---|---|
| *C21D 6/00* | (2006.01) |
| *C21D 8/12* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/16* | (2006.01) |
| *C22C 38/20* | (2006.01) |
| *C22C 38/34* | (2006.01) |
| *C22C 38/60* | (2006.01) |

(52) U.S. Cl.
CPC ......... *C21D 8/1233* (2013.01); *C21D 8/1255* (2013.01); *C21D 8/1266* (2013.01); *C21D 8/1272* (2013.01); *C21D 8/1283* (2013.01); *C21D 9/46* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/16* (2013.01); *C22C 38/20* (2013.01); *C22C 38/34* (2013.01); *C22C 38/60* (2013.01); *C22C 2202/02* (2013.01)

(56) References Cited

U.S. PATENT DOCUMENTS

| | | |
|---|---|---|
| 2017/0016085 A1 | 1/2017 | Toda et al. |
| 2017/0298467 A1 | 10/2017 | Suehiro et al. |
| 2018/0037965 A1 | 2/2018 | Takajo et al. |

FOREIGN PATENT DOCUMENTS

| | | |
|---|---|---|
| JP | 2015-161017 A | 9/2015 |
| JP | 2015-161024 A | 9/2015 |
| JP | 5841594 B2 | 1/2016 |
| JP | 6015723 B2 | 10/2016 |
| WO | WO 2015/129253 A1 | 9/2015 |
| WO | WO 2015/129255 A1 | 9/2015 |
| WO | WO 2016/056501 A1 | 4/2016 |
| WO | WO 2016/136176 A1 | 9/2016 |

OTHER PUBLICATIONS

"Test methods for electrical steel strip and sheet", JIS C 2550-1, (2011), total of 8 pages.

GRAIN-ORIENTED ELECTRICAL STEEL SHEET AND METHOD FOR PRODUCING GRAIN-ORIENTED ELECTRICAL STEEL SHEET

Priority is claimed on Japanese Patent Application No. 2018-054678, filed Mar. 22, 2018, the content of which is incorporated herein by reference.

TECHNICAL FIELD OF THE INVENTION

The present invention relates to a grain-oriented electrical steel sheet and a method for producing a grain oriented electrical steel sheet.

RELATED ART

A grain-oriented electrical steel sheet (also referred to as a "unidirectional electrical steel sheet") is a steel sheet which is formed of grains highly oriented and integrated in a {110}<001> orientation (hereinafter, also referred to as a "Goss orientation") and contains 7 mass % or less of silicon (Si). Grain-oriented electrical steel sheets are mainly used as iron core materials for transformers. In a case where grain-oriented electrical steel sheets are used as an iron core material of a transformer (that is, in a case where grain-oriented electrical steel sheets are laminated as an iron core), it is essential to secure insulation between layers (between the laminated steel sheets). Therefore, from the viewpoint of securing insulation, it is necessary to form a primary coating (glass coating) and a secondary coating (tension-applying insulation coating) on the surface of the grain-oriented electrical steel sheet.

A general method for producing a grain-oriented electrical steel sheet and a method for forming a glass coating and a tension-applying insulation coating are as follows.

First, after hot-rolling a steel piece containing 7 mass % or less of Si, one or two cold rollings with intermediate annealing therebetween are performed to obtain a steel sheet, to a predetermined sheet thickness after cold rolling. Thereafter, decarburization and primary recrystallization treatments are performed by annealing in a wet hydrogen atmosphere (decarburization annealing) to obtain a decarburization-annealed sheet. In such decarburization annealing, oxide film ($Fe_2SiO_4$ and $SiO_2$) are formed on the surface of the steel sheet. Subsequently, an annealing separating agent primarily containing MgO is applied onto the decarburization-annealed sheet and dried, and thereafter final annealing is performed. Such final annealing causes secondary recrystallization, and the grain structure of the steel sheet is integrated in a {110}<001> orientation. At the same time, on the surface of the steel sheet, MgO in the annealing separating agent reacts with the oxide films ($Fe_2SiO_4$ and $SiO_2$) formed on the surface of the steel sheet during the decarburization annealing, whereby a glass coating is formed. The surface of the steel sheet after the final annealing (finish-annealed sheet) (that is, the surface of the glass coating) is coated with a coating solution primarily containing phosphate and baked, whereby a tension-applying insulation coating is formed.

In addition, in some products in order to improve the magnetic characteristics of a grain-oriented electrical steel sheet, a magnetic domain is controlled by applying a strain using a laser, an electron beam, or the like. However, according to Patent Documents 1 to 7 below, it is described that such magnetic domain control increases magnetostriction and deteriorates the noise characteristics of the material. Patent Documents 1 to 7 below disclose a magnetic domain control method for gain-oriented electrical steel sheets for obtaining a grain-oriented electrical steel sheet having reduced magnetostriction and excellent noise characteristics.

PRIOR ART DOCUMENT

Patent Document

[Patent Document 1] PCT International Publication No. WO2015/129253
[Patent Document 2] PCT International Publication No. WO2016/136176
[Patent Document 3] Japanese Unexamined Patent Application, First Publication No. H5-335128
[Patent Document 4] PCT International Publication No. 129255
[Patent Document 5] Japanese Patent No. 6015723
[Patent Document 6] Japanese Unexamined Patent Application, First Publication No. 2015-161017
[Patent Document 7] Japanese Unexamined Patent Application, First Publication No. 2015-161024
[Patent Document 8] Japanese Unexamined Patent Application, First Publication No. 114-5524
[Patent Document 9] Japanese Patent No. 5841594

DISCLOSURE OF THE INVENTION

Problems to be Solved by the Invention

However, when the magnetic domain control conditions are optimized so as to achieve excellent noise characteristics, there is a possibility that iron loss may deteriorate. That is, since there is a trade-off relationship between iron loss and magnetostriction, it is difficult to achieve both at the same time. For example, according to the techniques disclosed in Patent Documents 1 to 3, although good noise characteristics can be obtained, the magnetic characteristics are insufficient, and it is difficult to achieve both excellent noise characteristics and magnetic characteristics. In addition, in Patent Documents 4 to 7 described above, conditions for achieving both noise characteristics and magnetic characteristics are proposed, but this applies only to optimization of magnetic domain control conditions, and there is a demand for achieving both the noise characteristics and magnetic characteristics in a higher level.

The present invention has been made in view of the above problems. An object of the present invention is to provide a grain-oriented electrical steel sheet and a method for producing a grain-oriented electrical steel sheet, capable of further improving magnetic characteristics without impairing the noise characteristics of the grain-oriented electrical steel sheet.

Means for Solving the Problem

In order to solve the above problems, the present inventors tried to evaluate the magnetic characteristics and noise characteristics of materials in which decarburization annealing conditions and magnetic domain control conditions had been variously changed. As a result, in some of the materials, it was confirmed that deterioration of noise characteristics due to magnetic domain control was small and magnetic characteristics were excellent. As a result of more detailed investigation, it was found that there is a possibility that the amount of change in magnetostriction due to magnetic domain control may be strongly affected by the secondary recrystallization structure of the base metal.

Magnetic domain control is a technique for improving iron loss by introducing thermal strain into a steel sheet and refining the magnetic domain structure. Ideally, when thermal strain is periodically introduced into a steel sheet by laser irradiation or the like and the thermal strain is formed in the laser irradiated portions on the surface of the steel sheet, a magnetic domain refining effect is exhibited without impairing magnetostriction. However, in reality, strains are introduced not only immediately below the laser irradiation portions but also between the pitches of the lase irradiated portions, and these strains (hereinafter sometimes referred to as "surplus strain") adversely affect the magnetostriction.

Previously, iron loss due to magnetic domain refinement and magnetostriction had a trade-off relationship. For example, in order to achieve magnetic domain refinement, it is required to introduce a linear thermal strain having a line width as sharp as possible. On the other hand, in order to improve iron loss, it is required to control the line width of the introduced thermal strain to 10 µm or more and 300 µm or less. However, in this case, a large amount of surplus strain is introduced, and the magnetostriction deteriorates. As described above, it has been difficult to achieve both the improvement in iron loss and magnetostriction.

However, as a result of investigations by the present inventors, it became clear that in a case where laser irradiation (introduction of thermal strain) is performed on a secondary recrystallization structure controlled to a predetermined state with a sharp line width, it is possible to realize low iron loss without impairing magnetostriction. That is, it was found that in order to further improve the noise characteristics and the magnetic characteristics, it is necessary to simultaneously perform the optimal combination of the control of the secondary recrystallization orientation of the base metal, and the magnetic domain control techniques applied thereto. Furthermore, as a result of further examinations by the present inventors, the application effects of the above-described technique were particularly remarkable in thin materials.

The present invention has been made based on the above findings, and the gist is as follows.

[1] A grain-oriented electrical steel sheet according to an aspect of the present invention includes, by mass %: a base steel sheet including, as a chemical composition, C: 0.005% or less, Si: 2.50% to 4.00%, Mn: 0.010% to 0.500%, N: 0.010% or less, P: 0.0300% or less, Sol. Al: 0.005% or less, S: 0.010% or less, Bi: 0% to 0.020%, Sn: 0% to 0.500%, Cr: 0% to 0.500%, Cu: 0% to 1.000%, Se: 0% to 0.080%, Sb: 0% to 0.50%, and a remainder of Fe and impurities; a glass coating provided on a surface of the base steel sheet; and a tension-applying insulation coating provided on a surface of the glass coating, in which, linear thermal strains having a predetermined angle φ with respect to a transverse direction which is a direction orthogonal to a rolling direction are periodically formed on a surface of the tension-applying insulation coating at predetermined intervals along the rolling direction, when the surface of the tension-applying insulation coating having the linear thermal strains is measured by an X-ray diffraction spectrum using Co Kα radiation as a radiation source, for a full width at half maximum of a diffraction peak in a range of 2θ=52.38±0.50° corresponding to a {110} plane strength of Fe, the full width at half maximum F1 on the linear thermal strain and the full width at half maximum F2 at an intermediate position between the two linear thermal strains adjacent to each other in units of ° satisfy the following Formula (1), when the linear thermal strains are observed with a scanning electron microscope for magnetic domain observation, a width of the linear thermal strain is 10 µm, or more and 300 µm or less, and in the base steel sheet, an orientation distribution angle γ around a rolling direction axis of secondary recrystallization grains, an orientation distribution angle α around an axis parallel to a normal direction, and an orientation distribution angle β around an axis perpendicular to each of the RD axis and the ND axis in units of ° satisfy the following Formulas (2) and (3).

$$0.00 < (F1-F2)/F2 \leq 0.15 \quad \text{Formula (1)}$$

$$1.0 \leq \gamma \leq 8.0 \quad \text{Formula (2)}$$

$$0.0 \leq (\alpha^2+\beta^2)^{0.5} \leq 10.0 \quad \text{Formula (3)}$$

[2] In the grain-oriented electrical steel sheet according to [1], the angle φ may satisfy the following Formula (4).

$$0.0 \leq |\varphi| \leq 20.0 \quad \text{Formula (4)}$$

[3] In the grain-oriented electrical steel sheet according to [1] or [2], the interval between the adjacent linear thermal strains in the rolling direction may be 2.0 mm or more and 10.0 mm or less.

[4] In the grain-oriented electrical steel sheet according to any one of [1] to [3], a sheet thickness of the base steel sheet may be 0.17 mm or more and 0.22 mm or less.

[5] In the gain-oriented electrical steel sheet according to any one of [1] to [4], the base steel sheet may contain, as the chemical composition, by mass %, Bi: 0.001% to 0.020%.

[6] In the grain-oriented electrical steel sheet according to any one of [1] to [5], the base steel sheet may contain, as the chemical composition, by mass %, one or more selected from Sn: 0.005% to 0.500%, Cr: 0.01% to 0.500%, and Cu: 0.01% to 1.000%.

[7] A method for producing a grain-oriented electrical steel sheet according to another aspect of the present invention, includes: a hot rolling step of heating a steel piece and thereafter hot-rolling the steel piece to obtain a hot-rolled steel sheet, the steel piece including, as a chemical composition, C: 0.010% to 0.200%, Si: 2.50% to 4.00%, Sol. Al: 0.010% to 0.070%, Mn: 0.010% to 0.500%, N: 0.020% or less, P: 0.0300 or less, S: 0.005% to 0.080%, Bi: 0% to 0.020%, Sn: 0% to 0.500%, Cr: 0% to 0.500%, Cu: 0 to 1.000%, Se: 0% to 0.080%, Sb: 0% to 0.50%, and a remainder of Fe and impurities; a hot-rolled sheet annealing step of annealing the hast-rolled steel sheet to obtain a hot-rolled and annealed steel sheet; a cold rolling step of performing one cold rolling or a plurality of cold rollings with intermediate annealing therebetween on the hot-rolled and annealed steel sheet, to obtain a cold-rolled steel sheet; a decarburization annealing step of performing decarburization annealing on the cold-rolled steel sheet to obtain a decarburization-annealed steel sheet; a final annealing step of applying an annealing separating agent to the decarburization-annealed steel sheet and thereafter performing final annealing; an insulation coating forming step of forming a tension-applying insulation coating on a surface of the steel sheet after the final annealing; and a magnetic domain refining step of introducing linear thermal strains into a surface of the tension-applying insulation coating by a laser beam or an electron beam, in which, in the decarburization annealing step, a temperature rising rate S0 (° C./sec) in a temperature range of 600° C. or higher and 800° C. or lower and an oxygen potential P0 satisfy the following Formulas (5) and (6), a soaking step of the decarburization annealing step includes a first soaking step of performing holding in an atmosphere having an oxygen potential P2 of 0.20 to 1.00 at a temperature T2° C. of 700° C. or higher and 900° C. or lower for a time of 10 seconds or longer and 1000 seconds or shorter, and a second soaking step, performed subsequently to the first soaking step, of performing holding in an atmosphere of an oxygen potential P3 that satisfies the following Formula (10) at a temperature T3° C. that satisfies the following Formula (11) for a time of 5 seconds or longer and 500 seconds or shorter, and, an average irradiation energy density Ua (mJ/mm$^2$) of the laser beam or the electron beam in the magnetic domain refining step satisfies the following Formula (7), $$400 \leq S0 \leq 2500 \quad \text{Formula (5)}$$

$$0.0001 \leq P0 \leq 0.10 \quad \text{Formula (6)}$$

$$1.0 \leq Ua \leq 5.0 \quad \text{Formula (7)}$$

$$P3 < P2 \quad \text{Formula (10)}$$

$$T2 + 50 \leq T3 \leq 1000 \quad \text{Formula (11)}$$

where the average irradiation energy density Ua is defined as Ua=PW/(Vc×PL), using a beam power PW (W), a scanning speed Vc (m/s) of the laser beam or the electron beam in a transverse direction, and a beam irradiation interval PL (mm) in a rolling direction.

[8] In the method for producing a grain-oriented electrical steel sheet according to [7], in the magnetic domain refining step, the linear thermal strains may be periodically introduced at predetermined intervals along the rolling direction so as to form a predetermined angle φ with respect to the transverse direction that is a direction orthogonal to the rolling direction, and the angle φ satisfies the following Formula (4).

$$0 \leq |\varphi| \leq 20.0 \quad \text{Formula (4)}$$

[9] In the method for producing a grain-oriented electrical steel sheet according to [7] or [8], in which, in the magnetic domain refining step, the laser beam or the electron beam may be irradiated such that the interval between the linear thermal strains adjacent to each other in the rolling direction is 2.0 mm or more and 10.0 mm or less.

[10] In the method for producing a grain-oriented electrical steel sheet according to any one of [7] to [9], in a temperature raising step of the decarburization annealing step, a temperature rising rate S1 (° C./sec) in a temperature range of 500° C. or higher and lower than 600° C. and an oxygen potential P1 may satisfy the following Formulas (8) and (9).

$$300 \leq S1 \leq 1500 \quad \text{Formula (8)}$$

$$0.0001 \leq P1 \leq 0.50 \quad \text{Formula (9)}$$

[11] In the method for producing a grain-oriented electrical steel sheet according to any one of [7] to [10], a sheet thickness of the cold-rolled steel sheet may be 0.17 mm or more and 0.22 mm or less.

[12] In the method for producing a grain-oriented electrical steel sheet according to anyone of [7] to [11], the steel piece may contain, as the chemical composition, by mass %, Bi: 0.001% to 0.020%.

[13] In the method for producing a grain-oriented electrical steel sheet according to any one of [7] to [12], the steel piece may contain, as the chemical composition, by mass %, one or more selected from Sn: 0.005% to 0.500%, Cr: 0.01% to 0.500%, and Cu: 0.01% to 1.000%.

Effects of the Invention

As described above, according to the aspects of the present invention, it is possible to further improve magnetic characteristics without impairing the noise characteristics of the grain-oriented electrical steel sheet.

EMBODIMENTS OF THE INVENTION

Figure 1:
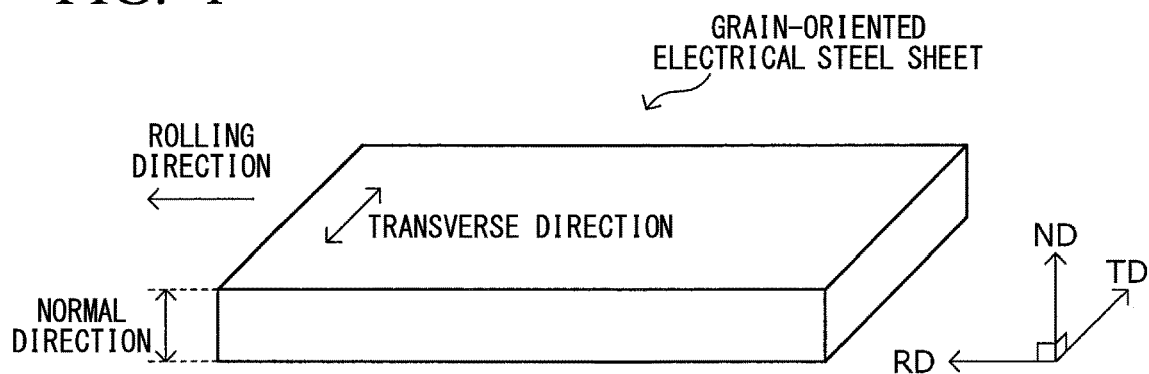
FIG. 1 is a view showing directions in a grain-oriented electrical steel sheet.

Hereinafter, a preferred embodiment of the present invention will be described in detail with reference to the drawings. In this specification and the drawings, like constituent elements having substantially the same function and configuration are denoted by like reference numerals, and redundant description will be omitted.

(Progress Leading to Present Invention)

In the following, first, prior to describing a grain-oriented electrical steel sheet according to an embodiment of the present invention (a grain-oriented electrical steel sheet according to the present embodiment) and a method for producing the same, findings obtained by intensive examinations by the present inventors, and the progress leading to the present invention based on the findings will be briefly described with reference to FIG. 1. FIG. 1 is a view showing directions in a grain-oriented electrical steel sheet.

As mentioned above, the present inventors tried to evaluate the magnetic characteristics and noise characteristics of materials in which decarburization annealing conditions and magnetic domain control conditions had been variously changed. As a result, in some of the materials, it as confirmed that deterioration of noise characteristics due to magnetic domain control was small, and magnetic characteristics were excellent. As a result of more detailed investigation, it was found that the amount of change in magnetostriction due to magnetic domain control is strongly affected by a secondary recrystallization orientation.

As described above, a magnetic domain refining technique is a technique for improving iron loss by introducing thermal strain to a steel sheet and refining the magnetic domain structure. The thermal strain is introduced by periodically irradiating the surface of a grain-oriented electrical steel sheet with a continuous-wave laser beam or an electron beam. As a result, thermal strain is periodically formed on the surface of the grain-oriented electrical steel sheet. However, in an actual operation, surplus strain is introduced not only in the above-described beam irradiated portions but also between adjacent beam irradiated portions (intermediate positions), and these surplus strains adversely affect magnetostriction.

The present inventors evaluated the relationship between the amount of change in magnetostriction and a secondary recrystallization structure, and as a result, found that regarding the secondary recrystallization orientation of a sample having a small amount of change in magnetostriction, the orientation distribution rotation around a rolling direction axis shown in FIG. 1 (a rolling direction axis of secondary recrystallization grains, hereinafter, also referred to as "RD axis") is large, and the orientation distribution rotation around an axis parallel to a normal direction (hereinafter, also referred to as "ND axis") shown in FIG. 1 and the orientation distribution rotation around an axis perpendicular to both the RD axis and the ND axis (hereinafter, also referred to as "TD axis") tend to be small. Although the cause of such a phenomenon is not completely clear, it is presumed that there are an orientation in which strain is easily introduced and an orientation in which strain is hardly introduced depending on the crystal orientation.

Based on such findings, the present inventors further conducted examinations, and as a result, arrived at a gain-oriented electrical steel sheet and a method for producing a grain-oriented electrical steel sheet according to the present embodiment as described in detail below.

(Grain-Oriented Electrical Steel Sheet)

Next, the grain-oriented electrical steel sheet according to the present embodiment will be described in detail.

<Main Configuration of Grain-Oriented Electrical Steel Sheet>

Figure 2A:
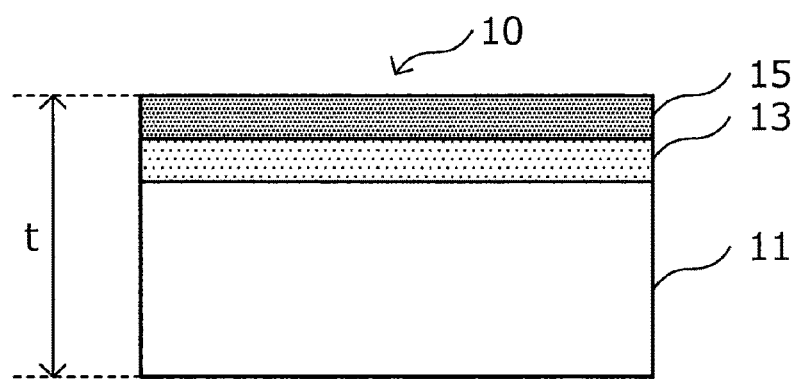
FIG. 2A is a view schematically showing a structure of a grain-oriented electrical steel sheet according to the present embodiment.
Figure 2B:
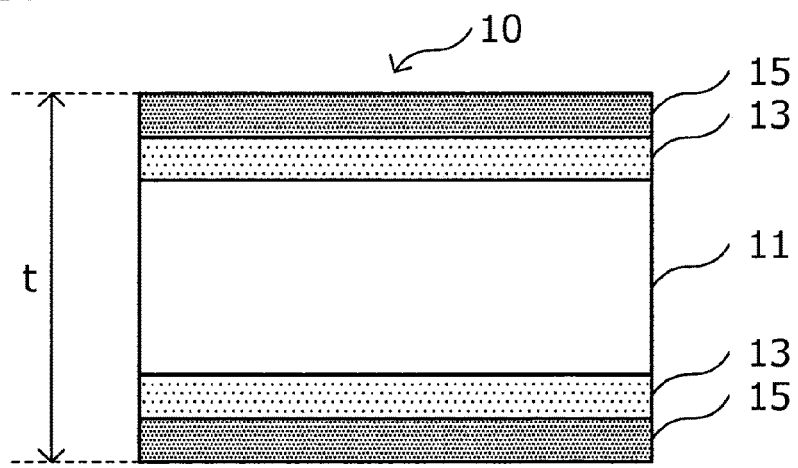
FIG. 2B is a diagram schematically showing a structure of the grain-oriented electrical steel sheet according to the embodiment.

First, a main configuration of the grain-oriented electrical steel sheet, according to the present embodiment will be described with reference to FIGS. 2A and 2B. FIGS. 2A and 2B are views schematically showing the structure of the grain-oriented electrical steel sheet according to the present embodiment.

As schematically shown in FIG. 2A, a grain-oriented electrical steel sheet 10 according to the present embodiment includes a base steel sheet 11, a glass coating 13 formed on the surface of the base steel sheet 11, and a tension-applying insulation coating 15 which is an example of an insulation coating formed on the surface of the glass coating 13. The glass coating 13 and the tension-applying insulation coating 15 may be formed on at least one surface of the base steel sheet 11, but are usually formed on both surfaces of the base steel sheet 11 as schematically shown in FIG. 2B.

Hereinafter, the gain-oriented electrical steel sheet 10 according to the present embodiment will be described focusing on a characteristic configuration. In the following description, detailed descriptions of known configurations and some configurations that can be implemented by those skilled in the art may be omitted.

[Base Steel Sheet 11]

When the base steel sheet 11 is produced from a steel piece containing a chemical composition as described in detail below, excellent noise characteristics and magnetic characteristics are exhibited. The chemical composition of the base steel sheet 11 will be described later in detail.

[Glass Coating 13]

The glass coating 13 is an inorganic coating primarily containing magnesium silicate, which is located on the surface of the base steel sheet 11. The glass coating is formed by a reaction between an annealing separating agent containing magnesia (MgO) applied to the surface of the base steel sheet and a component on the surface of the base steel sheet 11 during final annealing, and has a composition derived from the elements of the annealing separating agent and the base steel sheet (more specifically, a composition primarily containing $Mg_2SiO_4$).

[Tension-Applying Insulation Coating 15]

The tension-applying insulation coating 15 is located on the surface of the glass coating 13, and reduces eddy-current loss by applying electrical insulation to the grain-oriented electrical steel sheet 10, thereby improving the iron loss of the grain-oriented electrical steel sheet 10. In addition, the tension-applying insulation coating 15 realizes various characteristics such as corrosion resistance, heat resistance, and slipperiness in addition to the above-described electrical insulation.

Furthermore, the tension-applying insulation coating 15 has a function of applying tension to the grain-oriented electrical steel sheet 10. The iron loss of the grain-oriented electrical steel sheet 10 can be improved by applying tension to the grain-oriented electrical steel sheet 10 to facilitate domain wall movement in the grain-oriented electrical steel sheet 10.

Moreover, the surface of the tension-applying insulation coating 15 is subjected to a magnetic domain refining treatment using a continuous-wave laser beam or an electron beam by a method described in detail below. As a result, linear thermal strains having a predetermined angle φ with respect to a transverse direction, which is a direction orthogonal to a rolling direction, are periodically formed at predetermined intervals along the rolling direction. Accordingly, in the grain-oriented electrical steel sheet according to the present embodiment, the magnetic characteristics are further improved.

The tension-applying insulation coating 15 is formed, for example, by applying a coating solution containing metal phosphate and silica as main components to the surface of the glass coating 13 and baking the resultant.

<Sheet Thickness of Grain-Oriented Electrical Steel Sheet 10>

The product sheet thickness (thickness t in FIGS. 2A and 2B) of the grain-oriented electrical steel sheet 10 according to the present embodiment is not particularly limited, and may be, for example 0.17 mm or more and 0.35 mm or less. In the present embodiment, the effect becomes remarkable in case of a material having a sheet thickness as small as less than 0.22 mm after cold rolling (that is, a thin material), and the adhesion of the glass coating is further improved. For example, the sheet thickness after cold rolling is more preferably 0.17 mm or more and 0.20 mm or less.

<Chemical Composition of Base Steel Sheet 11>

Subsequently, the chemical composition of the base steel sheet 11 of the grain-oriented electrical steel sheet 10 according to the present embodiment will be described in detail. Hereinafter, unless otherwise specified, the notation "%" indicates "mass %".

In a case where a steel piece having the following chemical composition becomes a grain-oriented electrical steel sheet through the steps described in detail below, regarding elements other than carbon (C), acid-soluble aluminum (Sol. Al), nitrogen (N), and sulfur (S) of the base steel sheet 11, the same amounts as in the case of the steel piece are maintained. On the other hand, the amounts of carbon (C), acid-soluble aluminum (Sol. Al), nitrogen (N), and sulfur (S) change through the steps described in detail below.

[C: 0.010% or More and 0.200% or Less]

C (carbon) is an element having an effect of improving a magnetic flux density. However, in a case where the C content of the steel piece, exceeds 0.200%, the steel undergoes a phase transformation in secondary recrystallization annealing (that is, final annealing), so that secondary recrystallization does not sufficiently proceed, and good magnetic flux density and iron loss characteristics cannot be obtained. Therefore, the C content of the steel piece is set to 0.200% or less. The smaller the C content, the more preferable it is for reducing iron loss. Therefore, from the viewpoint of reducing iron loss, the C content is preferably 0.150% or less, and more preferably 0.100% or less.

On the other hand, in a case, where the C content of the steel piece is less than 0.010%, the effect of improving the magnetic flux density cannot be obtained. Therefore, the C content of the steel piece is set to 0.010% or more. The C content is preferably 0.040% or more, more preferably 0.060% or more.

Regarding the C content in the steel piece as described above, the steel piece becomes the grain-oriented electrical steel sheet 10 according to the present embodiment through the steps described in detail below, the C content in the base steel sheet 11 is 0.005% (50 ppm) or less.

[Si: 2.50% or more and 4.00 or less]

Si (silicon) is an extremely effective element for increasing the electric resistance (resistivity) of steel and reducing eddy-current loss constituting a part of iron loss. In a case where the Si content is less than 2.50%, the steel undergoes a phase transformation in secondary recrystallization annealing, so that secondary recrystallization does not sufficiently proceed, and good magnetic flux density and iron loss characteristics cannot be obtained. Therefore, in the steel piece and the base steel sheet 11 according to the present embodiment, the Si content is set to 2.50% or more. The Si content is preferably 3.00% or more, and more preferably 3.20% or more.

On the other hand, in a case where the Si content exceeds 4.00%, the steel sheet becomes embrittled, and passability in production steps significantly deteriorates. Therefore, in the steel piece and the base steel sheet 11 according to the present embodiment, the Si content is set to 4.00% or less. The Si content is preferably 3.80% or less, and more preferably 3.60% or less.

[Acid-Soluble Al: 0.010% or More and 0.070% or Less]

Acid-soluble aluminum (Sol. Al) is a main in inhibitor constituent element among compounds called inhibitors that affect secondary recrystallization in the grain-oriented electrical steel sheet, and is an essential element from the viewpoint of the appearance of secondary recrystallization in the base steel sheet 11 according to the present embodiment. In a case where the Sol. Al content of the steel piece is less than 0.010%, AlN functioning as an inhibitor is not sufficiently generated, secondary recrystallization is insufficient, and iron loss characteristics are not improved. Therefore, in the steel piece according to the present embodiment, the Sol. Al content is set to 0.010% or more. The Sol. Al content is preferably 0.015% or more, and more preferably 0.020%.

On the other hand, in a case where the Sol. Al content exceeds 0.070%, embrittlement of the steel sheet becomes significant. Therefore, in the steel piece according to the present embodiment, the Sol. Al content is set to 0.070% or less. The Sol. Al content is preferably 0.050% or less, and more preferably 0.030% or less.

Regarding the Sol. Al content in the steel piece as described above, when the steel piece becomes the grain-oriented electrical steel sheet 10 according to the present embodiment through the steps described below in detail, the Sol. Al content in the base steel sheet 11 is 0.005% (50 ppm) or less.

[Mn: 0.010% or More and 0.500% or Less]

Mn (manganese) is an important element that forms MnS, which is one of the main inhibitors. In a case where the Mn content is less than 0.010%, the absolute amount of MnS required to cause secondary recrystallization is insufficient. Therefore, in the steel piece and the base steel sheet 11 according to the present embodiment, the Mn content is set to 0.010% or more. The Mn content is preferably 0.030% or more, and more preferably 0.060% or more.

On the other hand, in a case where the Mn content exceeds 0.500%, the steel undergoes a phase transformation in secondary recrystallization annealing, so that secondary recrystallization does not sufficiently proceed, and good magnetic flux density and iron loss characteristics cannot be obtained. Therefore, in the steel piece and the base steel sheet 11 according to the present embodiment, the Mn content is set to 0.500% or less. The Mn content s preferably 0.300% or less, and more preferably 0.100% or less.

[N: 0.020% or Less]

N (nitrogen) is an element that reacts with the acid-soluble Al to ford AlN that functions as an inhibitor. In a case where the N content of the steel piece exceeds 0.020%, blisters (voids) are generated in the steel sheet during cold rolling, the strength of the steel sheet increases, and passability during production deteriorates. Therefore, in the steel piece according to the present embodiment, the N content of the steel piece is set to 0.020% or less. The N content is preferably 0.015% or less, and more preferably 0.010% or less. If AlN is not used as an inhibitor, the lower limit of the N content may include 0%. However, since the detection limit of chemical analysis is 0.0001%, the practical lower limit of the N content in practical steel sheets is 0.0001%. On the other hand, in order to form AlN that functions as an inhibitor by being bonded to Al, the N content is preferably 0.001% or more, and more preferably 0.005% or more.

Regarding the N content in the steel piece as described above, when the steel piece becomes the grain-oriented electrical steel sheet 10 according to the present embodiment through the steps described below in detail, the N content in the base steel sheet 11 is 0.010% (100 ppm) or less.

[S: 0.005% or More and 0.080% or Less]

S (sulfur) is an important element that forms MnS, which is an inhibitor, by reacting with Mn. In a case where the S content of the steel piece is less than 0.005%, a sufficient inhibitor effect cannot be obtained. Therefore, in the steel piece according to the present embodiment, the S content is set to 0.005% or more. The S content is preferably 0.010% or more, and more preferably 0.020% or more.

On the other hand, in a case where the S content of the steel piece exceeds 0.080%, this causes hot embrittlement and makes hot rolling extremely difficult. Therefore, in the steel piece according to the present embodiment, the S content is set to 0.080% or less. The S content is preferably 0.040% or less, and more preferably 0.030% or less.

Regarding the S content in the steel piece as described above, when the steel piece becomes the grain-oriented electrical steel sheet 10 according to the present embodiment through the steps described below in detail, the S content in the base steel sheet 11 is 0.010% (100 ppm) or less.

P: 0.0300% or Less

P is an element that deteriorates workability in rolling. By controlling the P content to be 0.0300% or less, an excessive deterioration in rolling workability can be suppressed, and fracture during production can be suppressed. From this viewpoint the P content is set to 0.0300% or less. The P content is preferably 0.0200% or less, and more preferably 0.0100% or less.

The lower limit of the P content may include 0%. However, since the detection limit of chemical analysis is 0.0001%, the practical lower limit of the P content in practical steel sheets is 0.0001%. P is also an element having an effect of improving a texture and improving magnetism. In order to obtain this effect, the P content may be set to 0.0010% or more, or may be set to 0.0050% or more.

In the steel piece and the base steel sheet 11 according to the present embodiment, in order to improve the characteristics of the grain-oriented electrical steel sheet according to the present embodiment, in addition to the various elements described above, in place of a part of Fe in the remainder, one or more of Se, Sb, Bi, Cr, Sn, and Cu may be further contained. Since Se, Sb, Bi, Cr, Sn, and Cu are optional elements in the steel piece and the base steel sheet 11 according to the present embodiment, the lower limit of the amounts thereof is 0%.

[Se: 0% or More and 0.080% or Less]

Se (selenium) is an element having a magnetism improvement effect. Therefore, Se may be contained. Se is an optional element in the steel piece and the base steel sheet 11 according to the present embodiment. Therefore, the lower limit of the amount thereof is 0%. However, in a case where Se is contained, the Se content is preferably set to 0.001% or more in order to sufficiently exhibit the magnetism improvement effect. Considering compatibility between magnetism and coating adhesion, the Se content is preferably 0.003% or more, and more preferably 0.006% or more.

On the other hand, if Se is contained in more than 0.080%, the glass coating significantly deteriorates. Therefore, the upper limit of the Se content is set to 0.080%. The Se content is preferably 0.050% or less, and more preferably 0.020% or less.

[Sb: 0% or More and 0.50% or Less]

Sb (antimony) is an element having a magnetism improvement effect, like Se. Therefore, Sb may be contained. Sb is an optional element in the steel piece and the base steel sheet 11 according to the present embodiment. Therefore, the lower limit of the amount thereof is 0%. However, in a case where Sb is contained, the Sb content is preferably set to 0.005% or more in order to sufficiently exhibit the magnetism improvement effect. Considering compatibility between magnetism and coating adhesion, the Sb content is preferably 0.01% or more, and more preferably 0.02% or more.

On the other hand, if Sb is contained in more than 0.50%, the glass coating significantly deteriorates. Therefore, the upper limit of the Sb content is set to 0.50%. The Sb content is preferably 0.30% or less, and more preferably 0.10% or less.

[Bi: 0% or More and 0.020% or Less]

Bi (bismuth) is an element having an effect of improving magnetic characteristics. Therefore, Bi may be contained. Bi is an optional element in the steel piece and the base steel sheet 11 according to the present embodiment. Therefore, the lower limit of the amount thereof is 0%. However, since it is not industrially easy to cause the amount, thereof to be 0%, the Bi content of a silicon steel sheet may be set to 0.0001% or more. In a case where Bi is contained, the Bi content is preferably set to 0.0005% or more, and more preferably set to 0.0010% in order to favorably exhibit the effect of improving the magnetic characteristics.

On the other hand, when the Bi content exceeds 0.020%, passability during cold rolling may deteriorate. Therefore, the Bi content is set to 0.020% or less. Furthermore, if Bi excessively remains as an impurity in the final product due to insufficient purification during final annealing, the magnetic characteristics may be adversely affected. Therefore, the Bi content is preferably 0.010% or less, and more preferably 0.005% or less.

[Cr: 0% or More and 0.500% or Less]

Cr (chromium), like Sn and Cu, which will be described later, is an element that contributes to an increase in the occupancy of the Goss orientation in a secondary recrystallization structure to improve magnetic characteristics and contributes to promotion of an improvement in the adhesion of the glass coating. Cr is an optional element in the steel piece and the base steel sheet 11 according to the present embodiment. Therefore, the lower limit of the amount thereof is 0%. However, in order to obtain such an effect, the Cr content is preferably set to 0.010% or more, and more preferably 0.030% or more.

On the other hand, in a case where the Cr content exceeds 0.500%, a Cr oxide is formed, and the magnetism decreases. Therefore, the Cr content is set to 0.500% or less. The Cr content is preferably 0.200% or less, and more preferably 0.100% or less.

[Sn: 0% or More and 0.500% or Less]

Sn (tin) is an element that contributes to the improvement in magnetism through control of a primary crystal structure. Sn is an optional element in the steel piece and the base steel sheet 11 according to the present embodiment. Therefore, the lower limit of the amount thereof is 0%. However, in order to obtain a magnetism improvement effect, the Sn content is preferably set to 0.005% or more. The Sn content is more preferably 0.009% or more.

On the other hand, in a case where the Sn content exceeds 0.500%, the secondary recrystallization becomes unstable, and the magnetic characteristics deteriorate. Therefore, in the base steel sheet 11 according to the present embodiment, the Sn content is set to 0.500% or less. The Sn content is preferably 0.300% or less, and more preferably 0.150% or less.

[Cu: 0 or More and 1.000% or Less]

Cu (copper), like Bi and Cr, is an element that contributes to an increase in the occupation ratio of the Goss orientation in a secondary recrystallization structure and also to an improvement in the adhesion of the glass coating. Cu is an optional element in the steel piece and the base steel sheet 11 according to the present embodiment. Therefore, the lower limit of the amount thereof is 0%. However, in order to obtain such an effect, the Cu content is preferably set to 0.010% or more. The Cu content is more preferably 0.030% or more. On the other hand, in a case where the Cu content exceeds 1.000%, the steel sheet becomes embrittled during hot rolling. Therefore, in the steel piece and the base steel sheet 11 according to the present embodiment, the Cu content is set to 1.000% or less. The Cu content is preferably 0.500% or less, and more preferably 0.100% or less.

In order to obtain the total amount of the chemical elements in the base steel sheet 11 from the grain-oriented electrical steel sheet 10, the tension-applying insulation coating 15 is removed by performing a washing treatment with an alkaline solution on the grain-oriented electrical steel sheet 10, a treatment to remove the glass coating 13 by pickling is further performed, and measurement may be performed using ICP-AES (Inductively Coupled Plasma—Atomic Emission Spectrometry). In this case, C and S may be measured using a combustion-infrared absorption method, N may be measured using an inert gas fusion-thermal conductivity method, and O may be measured using an inert gas fusion-non-dispersive infrared absorption method.

As a method for removing the tension-applying insulation coating, a unidirectional electrical steel sheet having a coating may be immersed in a high-temperature alkaline solution. Specifically, the tension-applying insulation coating can be removed from the unidirectional electrical steel sheet by being immersed in aqueous sodium hydroxide solution of NaOH: 30 to 50 mass %+$H_2O$: 50 to 70 mass % at 80° C. in 90° C. for 5 to 10 minutes, acid then washed with water and dried. The time of immersion in the above-mentioned aqueous sodium hydroxide solution may be changed depending on the thickness of the tension-applying insulation coating.

Furthermore, for example, as a method for removing the glass coating glass coating can be removed by being immersed in hydrochloric acid having a concentration of 30% to 40% at 80 to 90° C. for 1 to 5 minutes, and then washing with water and dried.

As described above, the alkaline solution is used to remove the insulation coating, and hydrochloric acid is used to remove the glass coating. As such, the removals are performed separately. By removing the insulation coating and the glass coating, the steel sheet appears and can be measured.

The steel composition of the slab (steel piece) may be subjected to compositional analysis by taking a sample from molten steel before casting, or may be subjected to compositional analysis by removing oxide films and the like on the surface from the slab after casting.

The remainder of the chemical composition of the steel piece and the base steel sheet 11 according to the present embodiment other than the above-mentioned elements (essential elements and optional elements) basically consists of Fe and impurities. However, even though the steel piece and the base steel sheet 11 contains, in place of a part of Fe in the remainder, a total of 5.00% or less preferably 3.00% or less, and more preferably 1.00% or less of one or two or more selected from Mo (molybdenum), W (tungsten), In (indium), B (boron), Au (gold), Ag (silver), and Te (tellurium), Ce (cerium), V (vanadium), Co (cobalt), Ni (nickel), Ca (calcium), Re (rhenium), Os (osmium), Nb (niobium), Zr (zirconium), Hf (hafnium), Ta (tantalum), Y (yttrium), La (lanthanum), Cd (cadmium), Pb (lead), As (arsenic), and the like for the purpose of improving characteristics required for structural members such as an improvement in magnetic characteristics, strength, corrosion resistance, and fatigue properties, improving castability and passability, and improving productivity by using scrap and the like, the effects of the grain-oriented electrical steel sheet according to the present embodiment are not lost. Since these elements are elements that can be optionally contained, the lower limit of the total amount of these elements is 0%.

The impurities are present in the steel piece and the base steel sheet 11 regardless of the intention of addition, and are elements that do not need to be present in the obtained grain-oriented electrical steel sheet. The term "impurities" is a concept that includes impurities that are incorporated from ore, scrap as raw materials when steel materials are industrially produced, production environments, and the like. Such impurities may be contained in an amount that does not adversely affect the effects of the grain-oriented electrical steel sheet according to the present embodiment.

Hereinabove, the chemical composition of the steel piece and the base steel sheet 11 according to the present embodiment has been described in detail.

<Thermal Strain Formed on Surface of Tension-Applying Insulation Coating 15>

Figure 3:
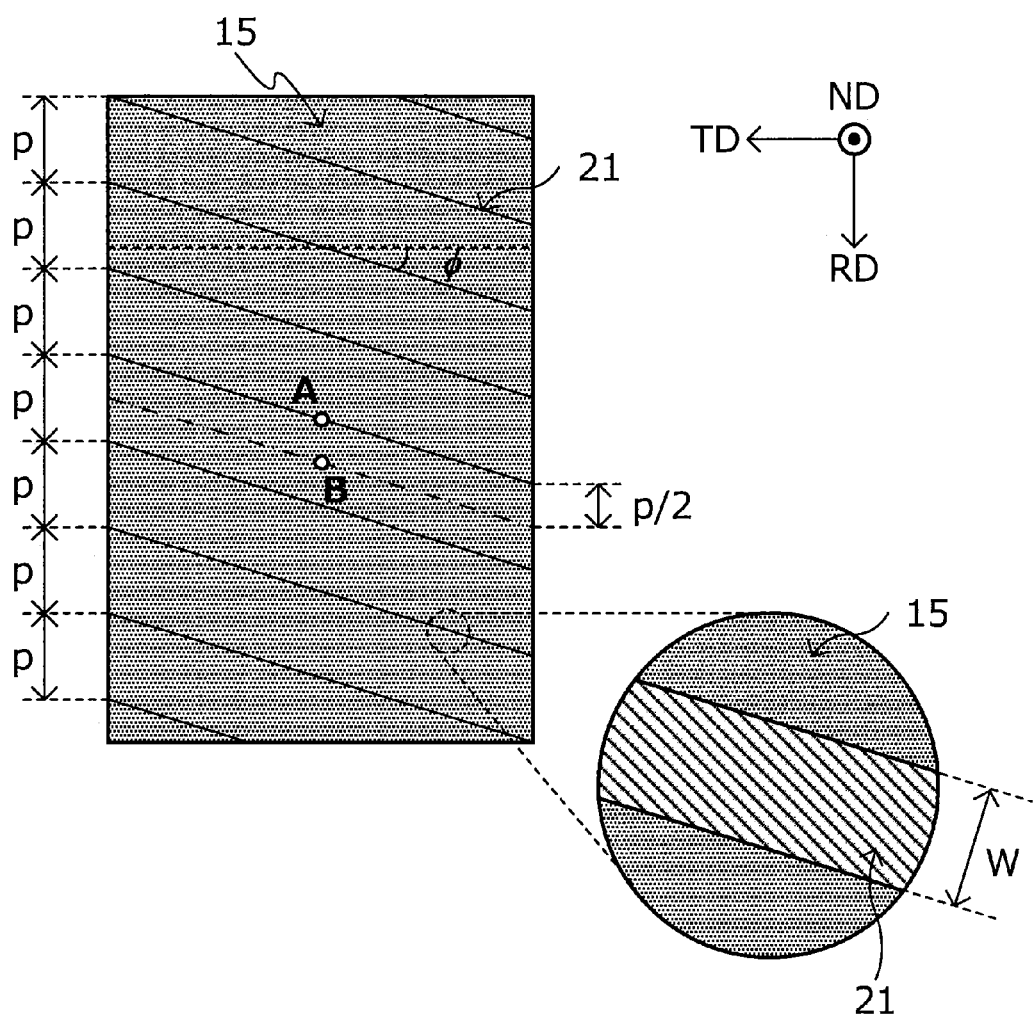
FIG. 3 is a view showing a tension-applying insulation coating of the grain-oriented electrical steel sheet according to the embodiment.

Subsequently, referring to FIG. 3, the thermal strain introduced into the tension-applying insulation coating 15 included in the grain-oriented electrical steel sheet 10 according to the present embodiment and formed on the surface of the tension-applying insulation coating 15 will be described in detail. FIG. 3 is a view showing the tension-applying insulation coating 15 of the grain-oriented electrical steel sheet 10 according to the present embodiment.

FIG. 3 is a schematic view of the tension-applying insulation coating 15 included in the grain-oriented electrical steel sheet 10 according to the present embodiment when viewed from above, and schematically shows linear thermal strains 21 that can be originally observed with a scanning electron microscope for magnetic domain observation (magnetic domain SEM).

As a factor affecting the noise characteristics that have attracted attention in the present embodiment, there is the presence of strain. The magnetic domain control by a laser beam or an electron beam as described above is a technique for improving iron loss by refining magnetic domains, but also introduces surplus strain.

In the grain-oriented electrical steel sheet 10 according to the present embodiment, as schematically shown in FIG. 3, linear thermal strains 21 having a predetermined angle φ with respect to a transverse direction (a direction parallel to a TD axis), which is a direction orthogonal to a rolling direction, are periodically introduced into the surface of the tension-applying insulation coating 15 at predetermined intervals along the rolling direction (a direction parallel to an RD axis).

For example, as the linear thermal strain required for magnetic domain refinement, it is preferable to introduce a linear thermal strain having a line width as sharp as possible. In order to improve iron loss, it is preferable that the beam line width of the laser beam or the electron beam (line width W in FIG. 3) is specifically 10 μm or more and 300 μm or less. In this case, the strain amount at the portion (the portion at point A in FIG. 3) into which the linear thermal strain 21 is introduced becomes the largest, the introduced strain amount (that can be considered as surplus strain amount) decreases from the linear thermal strain 21, and the surplus strain amount at the portion (the portion at point B in FIG. 3) separated from point A by p/2 in the rolling direction (the direction parallel to the RD axis) becomes the smallest. In a case where the linear thermal strains 21 are introduced with the beam line width W as described above, a large amount of surplus strain is introduced, and the magnetostriction of the grain-oriented electrical steel sheet decreases.

Although the line width W of the thermal strain 21 cannot be confirmed visually, the thermal strain 21 can be visualized and the line width W can be quantitatively evaluated by using a magnetic domain structure observation device such as a magnetic domain SEM.

The surplus strain amount introduced into the tension-applying insulation coating 15 can be evaluated by measuring an X-ray diffraction spectrum. Specifically, by evaluation of the ratio between the lattice strain of the linear thermal strain 21 (point A in FIG. 3) and the lattice strain between the linear thermal strains 21 (more specifically, point B in FIG. 3 (the middle point between one thermal strain 21 and the adjacent thermal strain 21 in the RD direction), the magnitude of the surplus strain can be determined.

The lattice strain can be evaluated by measuring, an X-ray diffraction (XRD) spectrum using Co Kα radiation as a radiation source and obtaining the full width at half maximum of a diffraction peak derived from the {110} plane of Fe (corresponding to the plane intensity). As the diffraction peak derived from the {110} plane of Fe, attention is paid to a diffraction peak detected in a range of 2θ=52.38±0.50°. In this case, the surplus strain amount can be defined by (F1−F2)/F2 using the full width at half maximum F1 (°) of the diffraction peak in a range of 2θ=52.38±0.50° in the XRD spectrum measured at point A, and the full width at half maximum F2 (°) of the diffraction peak in a range of 2θ=52.38±0.50° in the XRD spectrum measured at point B.

In the related art, when the line width W of the thermal strain 21 was controlled to be 10 μm or more and 300 μm or less from the viewpoint of obtaining a low iron loss, the orientation distribution angle γ (°) around the rolling direction axis (RD axis) of secondary recrystallization grains obtained by observing the linear thermal strains 21 with a magnetic domain SEM could not satisfy the relationship represented by Formula (101). In this case, the surplus strain amount (F1−F2)/F2 became more than 0.15, and the magnetostriction had deteriorated.

However, by controlling the secondary recrystallization structure by the method described in the present embodiment, in the base steel sheet 11 in which the orientation distribution angle γ (°) around the RD axis satisfies Formula (101), and the orientation distribution angle α (°) around the ND axis and the orientation distribution angle β (°) around the TD axis satisfy Formula (102) (that is, the base steel sheet 11 having crystal orientation defined by Formula (101) and Formula (102)), even if the linear thermal strains 21 are introduced under the condition that the line width W is 10 μm or more and 300 μm or less, the surplus strain amount (F1−F2)/F2 becomes 0.15 or less, and it became clear that both low iron loss and low magnetostriction can be achieved.

$$1.0 \leq \gamma \leq 8.0 \qquad \text{Formula (101)}$$

$$0.0 \leq (\alpha^2+\beta^2)^{0.5} \leq 10.0 \qquad \text{Formula (102)}$$

In Formula (101), in, a case where the orientation distribution angle γ (°) around the RD axis is less than 1.0 or exceeds 8.0, it is difficult to achieve both low iron loss and low magnetostriction. Furthermore, in Formula (102), even in a case where the value of $(\alpha^2+\beta^2)^{0.5}$ exceeds 10.0, it is difficult to achieve both low iron loss and low magnetostriction.

As described above, in a case where the orientation distribution angle γ is larger than the orientation distribution angles α and β, the magnetostriction becomes smaller. Therefore, a smaller value of $(\alpha^2+\beta^2)^{0.5}$ is more advantageous for the magnetostriction. Therefore, the value of $(\alpha^2+\beta^2)^{0.5}$ is preferably 0.0 or more and 4.0 or less. In addition, magnetostriction is further improved by causing the orientation distribution angle γ around the RD axis to be 2.5 or more and 5.0 or less, which is preferable.

The ideal Goss direction is the {110}<001> orientation. However, the actual crystal orientation is slightly deviated from {110}<001>. In the present embodiment, the deviation angles around the RD, ND, and TD axes with respect to the ideal Goss orientation {110}<001> are defined as the orientation distribution angles (γ, α, β). The crystal orientation of the gain-oriented electrical steel sheet can be obtained experimentally using, for example, a Laue diffractometer (RIGAKU RASCO-L II V). For example, by irradiating a grain-oriented electrical steel sheet of 100 mm in the transverse direction×500 mm in the length direction or 60 mm in the transverse direction×300 mm in the length direction with X-rays at intervals of 10 mm in the length direction and 10 mm in the transverse direction and fitting Laue diffraction spots using analysis software on a PC, Euler angles φ1, Φ, and φ2 are obtained. For example, since the Euler angles of the Goss orientation are given by φ1=0°, Φ=45°, and φ2=0° in the Bunge notation, by comparing orientation angles that are experimentally obtained with the Goss orientation angles, the deviation angles around the RD, ND, and TD axes, that is, the orientation distribution angles are obtained.

In the grain-oriented electrical steel sheet 10 according to the present embodiment, as will be described in detail below, by controlling the secondary recrystallization structure by controlling heat treatment conditions during decarburization annealing, the base steel sheet 11 having specific crystal orientations as described above an be produced. By introducing the linear thermal strains 21 into the grain-oriented electrical steel sheet 10 having the base steel sheet 11 by a magnetic domain refining method described in detail below, the surplus strain amount (F1−F2)/F 2 can be controlled to satisfy the relationship represented by Formula (103). As a result, in the grain-oriented electrical steel sheet 10 according to the present embodiment, it is possible to further improve the magnetic characteristics without impairing the noise characteristics.

$$0.00 < (F1-F2)/F2 \leq 0.15 \qquad \text{Formula (103)}$$

In a case where the surplus strain amount (F1−F2)/F2 is 0.00 or less, the strain amount introduced into the tension-applying insulation coating 15 becomes insufficient, and good magnetic characteristics cannot be obtained.

On the other hand, in a case where the surplus strain amount (F1−F2)/F2 exceeds 0.15, the magnetostriction deteriorates as described above. The surplus strain amount (F1−F2)/F2 is preferably 0.01 or more and 0.05 or less. The surplus strain amount (F1−F2)/F2 to be introduced can be controlled by adjusting the average irradiation energy density of the laser beam or the electron beam in a magnetic domain refining step, which will be described later.

The linear thermal strain 21 as schematically shown in FIG. 3 does not necessarily need to be perpendicular to the rolling direction (direction parallel to the RD axis) (that is, parallel to the TD axis), and may be in a range of ±20° with respect to the TD axis as shown in Formula (104). That is, as schematically shown in FIG. 3, the magnitude |φ| of the angle φ between the TD axis and the linear thermal strain 21 is preferably in a range of 0° or more and 20° or less.

$$0.0 \leq |\varphi| \leq 20.0 \qquad \text{Formula (104)}$$

Here, in a case where the magnitude of the angle φ exceeds 20°, it may be difficult to achieve a desired secondary recrystallization orientation. The magnitude of the angle φ is more preferably 0.0° or more and 10.0° or less.

As shown in FIG. 3, the interval p between adjacent linear thermal strains 21 (the interval from the center of the thermal strain to the center of the adjacent thermal strain 21 in the direction parallel to the RD axis) is preferably 2.0 mm or more and 10.0 mm or less. By setting the interval p to be 2.0 mm or more and 10.0 mm or less, it becomes possible to more reliably introduce desired thermal strains. The interval p between adjacent linear thermal strains 21 is more preferably 3.0 mm or more and 8.0 mm or less.

Hereinabove, the grain-oriented electrical steel sheet 10 according to the present embodiment has been described in detail.

Various magnetic characteristics of the grain-oriented electrical steel sheet according to the present embodiment are measured by the Epstein method specified in JIS C 2550-1 (2011) or the single sheet magnetic characteristic measurement method (single sheet tester (SST)) specified in JIS C 2556 (2011).

(Method for Producing Grain-Oriented Electrical Steel Sheet)

Figure 4:
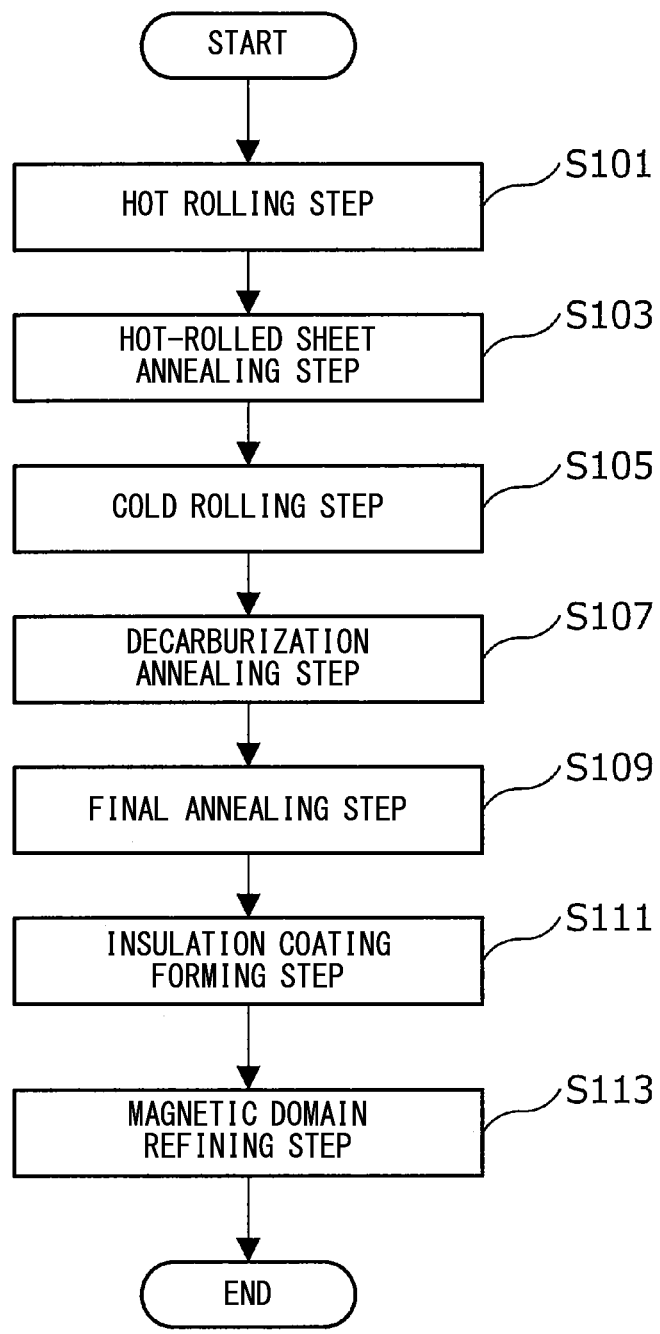
FIG. 4 is a flowchart showing an example of a flow of a method for producing a grain-oriented electrical steel sheet according to the embodiment.
Figure 5:
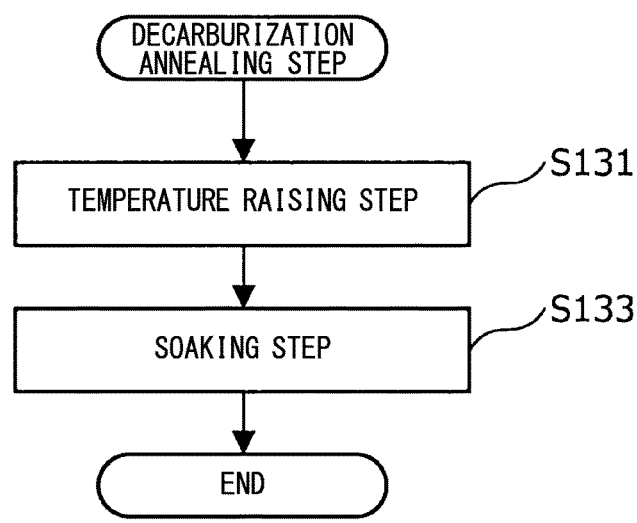
FIG. 5 is a flowchart showing an example of a flow of a decarburization annealing step according to the embodiment.
Figure 6:
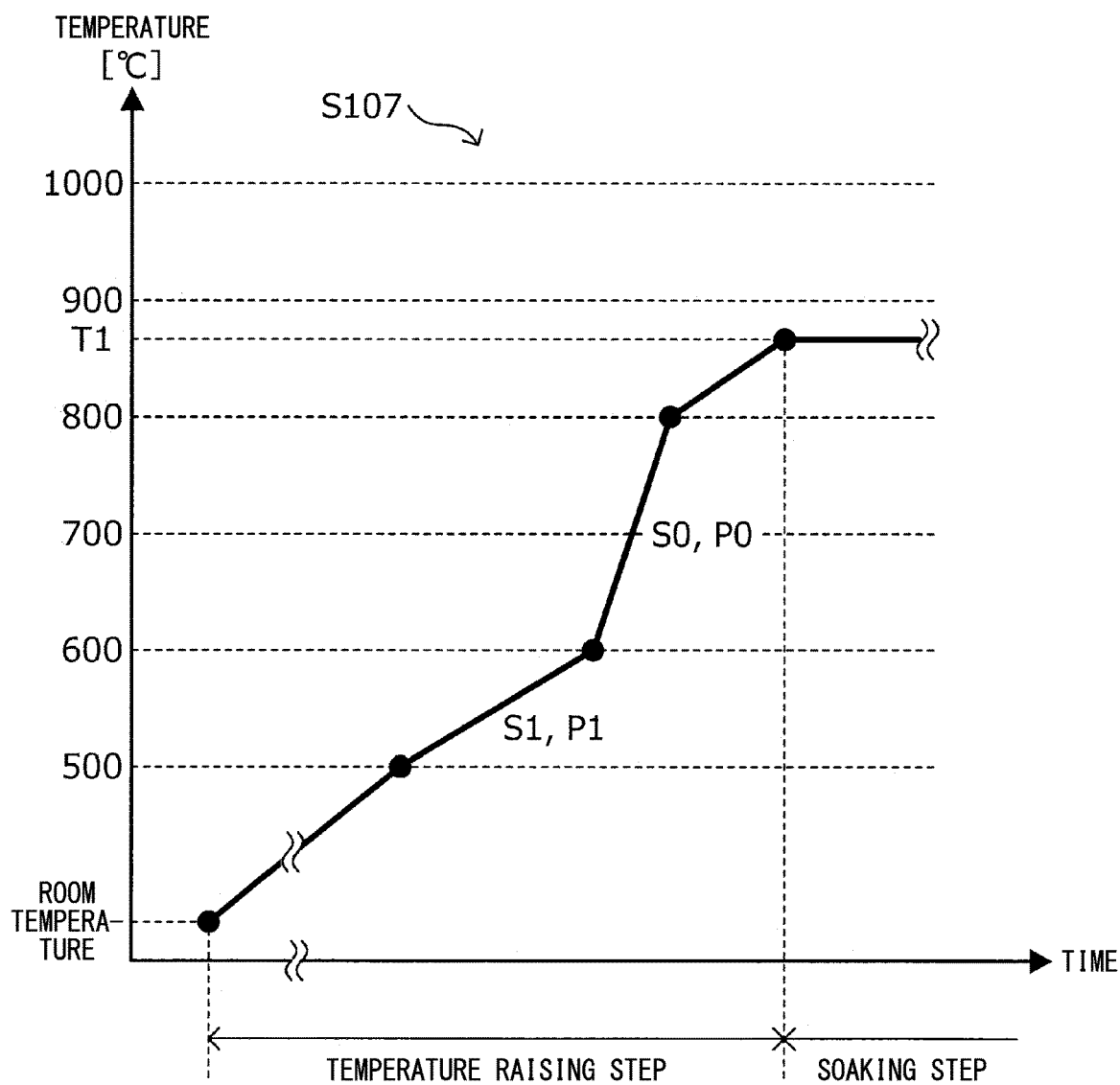
FIG. 6 is a view showing an example of a heat treatment pattern in the decarburization annealing step according to the embodiment.
Figure 7:
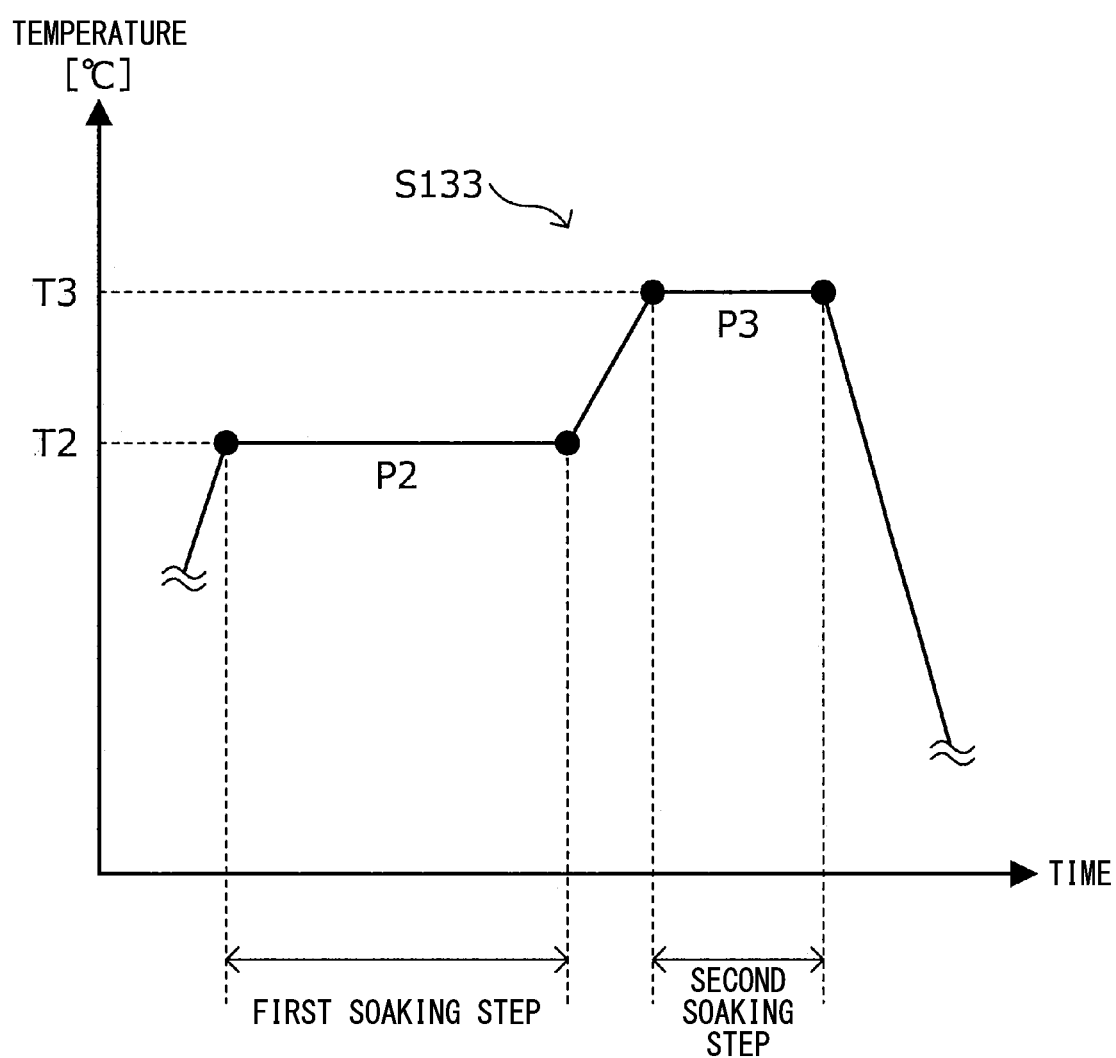
FIG. 7 is a view showing an example of a heat treatment pattern in the decarburization annealing step according to the embodiment.

Next, a method for producing a grain-oriented electrical steel sheet according to the present embodiment will be described in detail with reference to FIGS. 4 to 7. FIG. 4 is a flowchart showing an example of the flow of the method for producing a grain-oriented electrical steel sheet according to the present embodiment. FIG. 5 is a flowchart showing an example of the flow of a decarburization annealing step according to the present embodiment. FIGS. 6 and 7 are views showing an example of a heat treatment pattern in the decarburization annealing step according to the present embodiment.

<Overall Flow of Method for Producing Grain-Oriented Electrical Steel Sheet>

Hereinafter, the overall flow of the method for producing a grain-oriented electrical steel sheet according to the present embodiment will be described with reference to FIG. 4.

The overall flow of the method for producing a grain-oriented electrical steel sheet according to the present embodiment is as follows.

First, after a steel piece (slab) having the above chemical composition is hot-rolled, and then annealed to obtain a hot-rolled and annealed steel sheet. Next, the obtained hot-rolled and annealed steel sheet is pickled and then subjected to one or two cold rollings with intermediate annealing therebetween to obtain a cold-rolled steel sheet cold-rolled to a predetermined sheet thickness after cold rolling. Thereafter, the obtained cold-rolled steel sheet is subjected to decarburization and primary recrystallization by annealing in a wet hydrogen atmosphere (decarburization annealing) to obtain a decarburization-annealed steel sheet. In such decarburization annealing, a predetermined Mn-based oxide film is formed on the surface of the steel sheet. Subsequently, an annealing separating agent primarily containing MgO is applied to the surface of the decarburization-annealed steel sheet and dried, and then final annealing is performed. Such final annealing causes secondary recrystallization, and the grain structure of the steel sheet is integrated in a {110}<001> orientation. At the same time, on the surface of the steel sheet, MgO in the annealing separating agent reacts with the oxide films ($Fe_2SiO_4$ and $SiO_2$) formed on the surface of the steel sheet during the decarburization annealing, whereby a glass coating is formed. The final-annealed sheet is washed with water or pickled to remove powder, and then coated with a coating solution primarily containing phosphate and baked to form a tension-applying insulation coating.

That is, the method for producing a grain-oriented electrical steel sheet according to the present embodiment includes the following steps as shown in FIG. 4:

a hot rolling step (step S101) of hot-rolling a steel piece having the above chemical composition at a predetermined temperature to obtain a hot-rolled steel sheet;

a hot-rolled sheet annealing step (step S103) of annealing the obtained hot-rolled steel sheet to obtain a hot-rolled and annealed steel sheet;

a cold rolling step (step S105) of performing one cold rolling or a plurality of cold rollings with intermediate annealing therebetween on the obtained hot-rolled and annealed steel sheet, to obtain a cold-rolled steel sheet;

a decarburization annealing step (step S107) of performing decarburization annealing on the obtained cold-rolled steel sheet to obtain a decarburization-annealed steel sheet;

a final annealing step (step S109) of applying an annealing separating agent to the obtained decarburization-annealed steel sheet and thereafter performing final annealing;

an insulation coating forming step (step S111) of forming an insulation coating (more specifically, a tension-applying insulation coating) on the surface of the steel sheet after the final annealing; and a magnetic domain refining step (step S113) of introducing linear thermal strains into the surface of the tension-applying insulation coating by a laser beam or an electron beam.

Hereinafter, these steps will be described in detail. In the following description, in a case where any condition in each step is not described, each step can be performed by appropriately adapting known conditions.

<Hot Rolling Step>

The hot rolling step (step S101) is a step of hot-rolling a steel piece (for example, a steel ingot such as a slab) having a predetermined chemical composition to obtain a hot-rolled steel sheet. The composition of the steel piece is the composition described above. In such a hot rolling step, a steel piece of silicon steel having the above chemical composition is first heat-treated.

Here, the heating temperature is preferably set to be in a range of 1100° C. to 1450° C. The heating temperature is more preferably 1300° C. or higher and 1400° C. or lower. Next, the steel piece heated to the above-described temperature is worked into a hot-rolled steel sheet by subsequent hot rolling. The sheet thickness of the processed hot-rolled steel sheet is preferably, for example, in a range of 2.0 mm or more and 3.0 mm or less.

<Hot-Rolled Sheet Annealing Step>

The hot-rolled sheet annealing step (step S103) is a step of annealing the hot-rolled steel sheet produced through the hot rolling step to obtain a hot-rolled and annealed steel sheet. By performing such an annealing treatment, recrystallization occurs in the structure of the steel sheet, and it is possible to realize good magnetic characteristics.

In the hot-rolled sheet annealing step, the hot-rolled steel sheet produced through the hot rolling step may be annealed to obtain the hot-rolled and annealed steel sheet according to a known method. Means for heating the hot-rolled steel sheet during the annealing is not particularly limited, and a known heating method can be adopted. The annealing conditions are not particularly limited. For example, the hot-rolled steel sheet can be annealed in a temperature range of 900° C. to 1200° C. for 10 seconds to 5 minutes.

After the hot-rolled sheet annealing step and before the cold rolling step described in detail below, pickling may be performed on the surface of the hot-rolled steel sheet.

<Cold Rolling Step>

The cold rolling step (step S105) is a step of performing one or two or more cold rollings with intermediate annealing therebetween on the hot-rolled and annealed steel sheet to obtain a cold-rolled steel sheet. In addition, in a case where the hot-rolled sheet annealing as described above is performed, the shape of the steel sheet is improved, so that a possibility of fracture of the steel sheet in the first rolling can be reduced. The cold rolling may be performed three or more times, but is preferably performed once or twice so as not to increase the production cost.

In the cold rolling step, the hot-rolled and annealed steel sheet may be cold-rolled into a cold-rolled steel, sheet according to a known method. For example, the final rolling reduction can be in a range of 80% or more and 95% or less. In a case where the final rolling reduction is less than 80%, the possibility that a Goss nucleus having a {110}<001> orientation with a high degree of integration in the rolling direction cannot be obtained increases, which is not preferable.

On the other hand, in a case where the final rolling reduction exceeds 95%, the possibility of secondary recrystallization becoming unstable in the subsequent final annealing step increases, which is not preferable. By setting the final rolling reduction to be within the above range, a Goss nucleus having a {110}<001> orientation with a high degree of integration in the rolling direction can be obtained, and the instability of secondary recrystallization can be suppressed.

The final rolling reduction is the cumulative rolling reduction of the cold rolling, and is the cumulative rolling reduction of cold rolling after intermediate annealing in a case where intermediate annealing is performed.

In a case where two or more cold rollings with intermediate annealing therebetween are performed, it is preferable that the first cold rolling is performed at a rolling reduction of about 5% to 50% and the intermediate annealing is performed at a temperature of 950° C. to 1200° C. for about 30 seconds to 30 minutes.

Here, the sheet thickness of the cold-rolled steel sheet subjected to the cold rolling (the sheet thickness after cold rolling) is usually different from the sheet thickness of a grain-oriented electrical steel sheet finally produced (product sheet thickness including the thickness of the tension-applying insulation coating). The product sheet thickness of the grain-oriented electrical steel sheet is as described above.

In the cold rolling step as described above, an aging treatment can be given to further improve the magnetic characteristics. Each sheet thickness stage is passed by a plurality of passes during the cold rolling, but it is preferable that a heat effect of holding the steel sheet in a temperature range of 100° C. or higher for a time of 1 minute or longer is given in at least one or more intermediate sheet thickness stages. Due to such a heat effect, it is possible to form a better primary recrystallization texture in the subsequent decarburization annealing step, and furthermore it is possible to sufficiently develop good secondary recrystallization with the {110}<001> orientation aligned with the rolling direction in the subsequent final annealing step.

<Decarburization Annealing Step>

The decarburization annealing step (step S107) is a step of performing decarburization annealing on the obtained cold-rolled steel sheet to obtain a decarburization annealed steel sheet. In the method for producing a grain-oriented electrical steel sheet according to the present embodiment, in the decarburization annealing step, the secondary recrystallization structure is controlled by performing an annealing treatment in accordance with predetermined heat treatment conditions.

As shown in FIG. 5, the decarburization annealing step according to the present embodiment includes a temperature raising step (step S131) and a soaking step (step S133) in order to obtain a desired secondary recrystallization structure.

The temperature raising step (step S131) is a step of raising the temperature of the cold-rolled steel sheet obtained in the cold rolling step from room temperature to a temperature T1 (° C.) in a range of 700° C. or higher and 1000° C. or lower at which the subsequent soaking step is performed, at a predetermined temperature rising rate. In addition, the soaking step (step S131) is a step of holding the cold-rolled steel sheet raised in temperature at a predetermined temperature rising rate at a predetermined temperature for a predetermined time for annealing.

Hereinafter, these steps will be described in detail with reference to FIGS. 6 and 7.

In the diagrams of the heat treatment patterns shown in FIGS. 6 and 7, the graduation intervals on the vertical and horizontal axes are not accurate, and the heat treatment patterns shown in FIGS. 6 and 7 are merely schematic.

[Temperature Raising Step]

The temperature raising step according to the present embodiment is a step for controlling the texture of secondary recrystallization grains, which plays a particularly important role in the present invention. In the present embodiment, as production conditions that satisfies the secondary recrystallization orientation contributing to low noise, there are a temperature rising rate and atmosphere control in the decarburization annealing. Specifically, in the temperature raising step according to the present embodiment, control is performed so that a temperature rising rate S0 (° C./sec) satisfies Formula (201) in a temperature range of 600° C. to 800° C. as shown in FIG. 6 and the atmosphere at the time of temperature raising (more specifically, an oxygen potential P0 (-)) satisfies Formula (202).

$$400 \leq S0 \leq 2500 \quad \text{Formula (201)}$$

$$0.0001 \leq P0 \leq 0.10 \quad \text{Formula (202)}$$

In the temperature raising step according to the present embodiment, as the temperature rising rate S0 in the temperature range of 600° C. to 800° C. increases, in the secondary recrystallization structure, the magnitudes of the orientation distribution angles α and β tend to decrease, and the orientation distribution angle γ tends to increase. In order to reliably develop such a tendency, the temperature rising rate S0 in the temperature range of 600° C. to 800° C. is set to 400° C./sec or more. On the other hand, in a case where the temperature rising rate S0 in the temperature range of 600 to 800° C. exceeds 2500° C./see, there is a possibility of overshoot, so that the temperature rising rate S0 in the temperature range of 600° C. to 800° C. is set to 2500° C./sec or less. The temperature rising rate S0 in the temperature range of 600° C. to 800° C. is preferably 1000° C./sec or more and 2000° C./sec or less.

The temperature range of 600° C. to 800° C. is the recrystallization temperature range of iron, and the phase transformation temperature between ferrite and austenite also exists in this temperature range. It is considered that the temperature rising rate affects recrystallization and phase transformation, and affects the orientation selectivity of the structure of the decarburization-annealed sheet.

In the temperature range of 600° C. to 800° C., it is particularly preferable that the temperature rising rate S01 at 700° C. to 800° C. is set to 700° C./sec or more and 2000° C./sec or less. This is because the magnitudes of the orientation distribution angles α and β are reduced by controlling the temperature sing rate at 700° C. to 800° C. It is considered that the reason for this is that, by increasing the temperature rising rate at 700° C. to 800° C., {411}<148> grains develop, which are in an orientation which contribute to reduce the orientation distribution angles α and β among orientations (orientations corresponding to Σ9) on which the Goss orientation encroaches. The temperature rising rate at 700° C. to 800° C. is more preferably 1000° C./sec or more and 2000° C./sec or less, and even more preferably 1300° C./sec or more and 2000° C./sec or less.

It is also important to control the atmosphere during the temperature raising. Although the grain-oriented electrical steel sheet 10 according to the present embodiment contains carbon, if the oxygen potential P0 in the temperature range of 600° C. to 800° C. is high, decarburization occurs. Since the carbon content strongly influences the phase transformation behavior, in a case where decarburization occurs during the temperature raising, a desired secondary recrystallization structure cannot be obtained. Therefore, in the temperature raising step according to the present embodiment, the oxygen potential P0 in the temperature range of 600° C. to 800° C. is set to 0.10 or less. On the other hand, the tower limit of the oxygen potential P0 in the temperature range of 600° C. to 800° C. is not particularly specified. However, since it is difficult to control the oxygen potential to less than 0.0001, the oxygen potential P0 in the temperature range of 600° C. to 800° C. is set to 0.0001 or more. The oxygen potential P0 in the temperature range of 600° C. to 800° C. is preferably 0.0001 to 0.05. The oxygen potential is defined by the ratio between the water vapor partial pressure $P_{H2O}$ and the hydrogen partial pressure of $P_{H2}$ (that is, $P_{H2O}/P_{H2}$) in the atmosphere.

When rapid heating is performed at a heating rate of 400° C./sec or more at an oxygen potential of 0.10 or less, there is a concern that a $SiO_2$ coating is excessively generated during overshoot. In the grain-oriented electrical steel sheet 10 according to the present embodiment, by causing the maximum attainment temperature to be 950° C. and thus suppressing overshoot, excessive generation of the $SiO_2$ coating can be suppressed.

In addition, from the viewpoint of ensuring the adhesion of the glass coating, it is preferable that a temperature rising rate S1 (° C./sec) and a oxygen potential P1 in the temperature range of 500° C. or higher and lower than 600° C. in the temperature raising step are controlled so as to respectively satisfy Formula (203) and Formula (204). Even if such control is performed, there is no adverse effect.

$$300 \leq S1 \leq 1500 \quad \text{Formula (203)}$$

$$0.0001 \leq P1 \leq 0.50 \quad \text{Formula (204)}$$

In the temperature range of 500° C. or higher and lower than 600° C., by securing the above-mentioned temperature rising rate S1 and oxygen potential P1, it is possible to form a Mn-based oxide film that is advantageous for the adhesion of the glass coating. The advantage of the adhesion of the glass coating is synonymous with strong tension of the glass coating. It has been found that materials having excellent glass coating adhesion also have excellent noise characteristics. Therefore, by controlling the temperature rising rate and the atmosphere so as to satisfy Formula (203) and Formula (204) are satisfied, it is possible to realize a further reduction in noise in the grain-oriented electrical steel sheet.

The temperature rising rate S1 in the temperature range of 500° C. or higher and lower than 600° C. is more preferably 300° C./sec or more and 700° C./sec or less, and the oxygen potential P1 in the temperature range of 500° C. or higher and lower than 600° C. is more preferably 0.0001 or more and 0.10 or less.

[Soaking Step]

In the soaking step (step S133) according to the present embodiment, for example, as shown in FIG. 7, the soaking step preferably includes two steps.

That is, as shown in the heat treatment pattern in FIG. 7, the soaking step according to the present embodiment may include a first soaking step of performing holding in an atmosphere of a predetermined oxygen potential P2 at a temperature T2 (° C.) of 700° C. or higher and 900° C. or lower for a time of 10 seconds or longer and 1000 seconds or shorter, and a second soaking step, performed subsequently to the first soaking step, of performing holding in an atmosphere of an oxygen potential P3 that satisfies Formula (205) at a temperature T3 (° C.) that satisfies Formula (206) for a time of 5 seconds or longer and 500 seconds or shorter. Hereinafter, such annealing treatment including a plurality of soaking steps is also referred to as multi-stage annealing.

$$P3 < P2 \quad \text{Formula (205)}$$

$$T2 + 50 \leq T3 \leq 1000 \quad \text{Formula (206)}$$

When such two-stage annealing is performed, it is important to control the annealing temperature and the retention time in the first and second stages.

From the viewpoint of improving decarburization, for example, in the first soaking step, the annealing temperature T2 (sheet temperature) is preferably 700° C. or higher and 900° C. or lower. The retention time at the annealing temperature T2 is preferably 10 seconds or longer and 1000 seconds or shorter. In a case where the annealing temperature T2 is lower than 700° C., the decarburization does not proceed, resulting in poor decarburization, which is not preferable.

On the other hand, in a case where the annealing temperature T2 exceeds 900° C. the grain structure becomes coarse and secondary recrystallization failure (magnetism failure) is caused, which is not preferable. Furthermore, even in a case where the retention time is shorter than 10 seconds, the decarburization does not proceed and decarburization failure is caused, which is not preferable. Increasing the retention time itself is not a problem from the viewpoint of decarburization, but from the viewpoint of productivity, the retention time is preferably set to 1000 seconds or shorter. An annealing temperature T3 is more preferably 780° C. or higher and 860° C. or shorter. In addition, the retention time is more preferably 50 seconds or longer and 300 seconds or shorter in the production of a practical steel sheet.

Furthermore, from the viewpoint of securing the amount of the Mn-based oxide formed, which is advantageous for the adhesion of the glass coating, the oxygen potential P2 during annealing in the first soaking step is set to be higher than the oxygen potential P1 in the temperature range of 500° C. to 600° C. in the temperature raising step (P2>P1). By being a sufficient oxygen potential, the decarburization reaction can sufficiently proceed. However, when the oxygen potential P2 during the annealing in the first soaking step is too large, there are cases where the Mn-based oxide ($Mn_2SiO_4$) is replaced by $Fe_2SiO_4$. This $Fe_2SiO_4$ deteriorates the adhesion of the glass coating. Therefore, the oxygen potential P2 during the annealing in the first soaking step is controlled within the range of 0.20 or more and 1.00 or less. The oxygen potential P2 during the annealing in the first soaking step is preferably 0.20 or more and 0.80 or less.

Even if such control is performed, the generation of $Fe_2SiO_4$ in the first soaking step cannot be completely suppressed. Therefore, in the second soaking step performed after the first soaking step, it is preferable that the annealing temperature T3 (sheet temperature) is within the range defined by Formula (206). This is because, by setting the annealing temperature T3 to be within the range defined by Formula (206), even if $Fe_2SiO_4$ is generated in the first soaking step, the generated $Fe_2SiO_4$ is reduced to a Mn-based oxide ($Mn_2SiO_4$). The annealing temperature T3 is more preferably (T2+100)° C. or higher and 1000° C. or lower.

The retention time at the annealing temperature T3 in the second soaking step is set to 5 seconds or longer and 500 seconds or shorter. In a case where the retention time is shorter than 5 seconds, even in a case where the annealing temperature is within the above range, there is a possibility that $Fe_2SiO_4$ generated in the first soaking step cannot be reduced to a Mn-based oxide ($Mn_2SiO_4$). On the other hand, in a case where the retention time exceeds 500 seconds, there is a possibility that the generated Mn-based oxide ($Mn_2SiO_4$) may be reduced to $SiO_2$. The retention time at the annealing temperature T4 in the second soaking step is more preferably 10 seconds or longer and 100 seconds or shorter.

In order to set the second soaking step to be in a reducing atmosphere, the oxygen potential P3 in the second soaking step is preferably set to be smaller than the oxygen potential P2 in the first soaking step, as shown in Formula (205). For example, by controlling the oxygen potential P3 in the second soaking step to be 0.0001 or more and 0.10 or less it is possible to obtain better glass coating adhesion and magnetic characteristics.

The time interval between the first soaking step and the second soaking step is not particularly specified, but is preferably as short as possible, and it is preferable that the first soaking step and the second soaking step are continuously performed. In a case where the first soaking step and the second soaking step are continuously performed, two continuous annealing furnaces that are controlled to satisfy the conditions of each soaking step may be provided in succession.

Regarding the ratio between the soaking time in the first soaking step to the soaking time in the second soaking step, the first soaking time/the second soaking time is preferably more than 0.5, more preferably more than 1.0, and even more preferably more than 10.0. The upper limit thereof is preferably less than 80.0, more preferably less than 60.0, and even more, preferably less than 30.0. By controlling the annealing time within the above range, the grain size of the decarburization-annealed sheet is controlled to an appropriate size, and stable development of secondary recrystallization is facilitated.

<Nitriding Step>

The manufacture method of the grain-oriented electrical steel sheet according to the present embodiment may include a nitriding treatment step of performing a nitriding treatment after the decarburization annealing step and before the final annealing step. In the nitriding treatment step, a nitriding treatment is performed on the decarburization-annealed steel sheet after the decarburization annealing step. The nitriding treatment may be performed under well-known conditions, but preferred nitriding treatment conditions are, tor example, as follows.

Nitriding treatment temperature: 700° C. to 850° C.

Atmosphere in a nitriding treatment furnace (nitriding treatment atmosphere): Atmosphere containing a gas having a nitriding ability such as hydrogen, nitrogen, and ammonia When the nitriding treatment temperature is 700° C. or higher, or when the nitriding treatment temperature is lower than 850° C., nitrogen easily infiltrates into the steel sheet in the nitriding treatment. In this case, in the nitriding step, a sufficient, amount of nitrogen inside the steel sheet can be secured, and fine AlN can be sufficiently obtained immediately before secondary recrystallization. As a result, secondary recrystallization sufficiently occurs in the final annealing step. The retention time at the nitriding treatment temperature in the nitriding treatment step is not particularly limited, and is, for example, 10 to 60 seconds.

<Final Annealing Step>

Returning to FIG. 4, the final annealing step in the method for producing a grain-oriented electrical steel sheet according to the present embodiment will be described.

The final annealing step (step S109) is a step of applying an annealing separating agent to the decarburization-annealed steel sheet obtained in the decarburization annealing step (including the decarburization-annealed steel sheet further subjected to the nitriding treatment step as necessary) and thereafter performing final annealing. Here, the final annealing is generally performed for a long period of time in a state where the steel sheet is coiled in a coil shape. Therefore, prior to the final annealing, the annealing separating agent is applied to the decarburization-annealed steel sheet and dried for the purpose of preventing seizure between inside and outside of the coiled steel sheet. As the annealing separating agent, for example, an annealing separating agent primarily containing magnesia (MgO) can be used. For example, the annealing separating agent may substantially consists of magnesia (MgO), and may contain a Ti compound in an amount of 0.5 mass % or more and 10 mass % or less in terms of metallic Ti.

The heat treatment conditions in the final annealing are not particularly limited, and known conditions can be appropriately adopted. For example, final annealing can be performed by performing holding in a temperature range of 1100° C. or higher and 1300° C. or lower for 10 hours or longer and 60 hours or shorter. The atmosphere during the final annealing may be, for example, a nitrogen atmosphere or a mixed atmosphere of nitrogen and hydrogen. In the case of the mixed atmosphere of nitrogen and hydrogen, the oxygen potential of the atmosphere is preferably set to 0.5 or less.

During the final annealing as described above, the secondary recrystallization is integrated in the {110}<001> orientation, and coarse grains having a magnetization easy axis aligned in the rolling direction are generated. As a result, excellent magnetic characteristics are realized. At the same time, on the surface of the steel sheet, MgO in the annealing separating agent reacts with the oxide generated by the decarburization annealing to form a glass coating.

<Insulation Coating Forming Step>

The insulation coating forming step (step S111) is a step of forming a tension-applying insulation coating on both surfaces of the cold-rolled steel sheet after the final annealing step. Here, the insulation coating forming step is not particularly limited, and the application, drying, and baking of a treatment liquid may be performed by a known method using a known insulation coating treatment liquid as described below. By further forming the tension-applying insulation coating on the surface of the steel sheet, it is possible to further improve the magnetic characteristics of the grain-oriented electrical steel sheet.

Before applying the treatment liquid, the surface of the steel sheet on which the insulation coating is formed may be subjected to any pretreatment such as degreasing with an alkali or the like, or pickling with hydrochloric acid, sulfuric acid, phosphoric acid, or the like, or may be the surface as it is after the final annealing without being subjected to these pretreatments.

Here, the insulation coating formed on the surface of the steel sheet is not particularly limited as long as it is used as the insulation coating of the grain-oriented electrical steel sheet, and a known insulation coating can be used. Examples of such an insulation coating include a composite insulation coating that primarily contains an inorganic substance and further contains an organic substance. Here, the composite insulation coating is, for example, an insulation coating primarily containing at least any of inorganic substances such as a metal chromate, a metal phosphate, colloidal silica, a Zr compound, and a Ti compound, and containing fine organic resin particles dispersed therein. In particular, from the viewpoint of reducing an environmental load during production, which has been increasingly required in recent years, an insulation coating using a metal phosphate, a coupling agent of Zr or Ti, or a carbonate or an ammonium salt thereof as a starting material is preferably used.

Furthermore, subsequently to the above-described insulation coating forming step, flattening annealing for shape correction may be performed. By performing flattening annealing on the steel sheet, it is possible to further reduce iron loss. In the case of performing the flattening annealing, the baking in the coating forming step may be omitted.

<Magnetic Domain Refining Step>

The magnetic domain refilling step (step S113) is a step of introducing linear thermal strains into the surface of the tension-applying insulation coating by a laser beam or an electron beam to refine the magnetic domains of the base steel sheet 11.

In the magnetic domain refining, step according to the present embodiment, the amount of strain to be introduced is controlled by controlling the beam irradiation conditions including the irradiation intensity of the laser beam, or the electron beam. More specifically, by controlling the energy input to the tension-applying insulation coating per unit area (that is, average irradiation energy density) $Ua$ (mJ/mm$^2$), thermal strain is introduced into the tension-applying insulation coating.

Here, in order to realize both low iron loss and low magnetostriction, in the magnetic domain refining step according to the present embodiment, the average irradiation energy density $Ua$ is controlled so as to satisfy Formula (207). The average irradiation energy density $Ua$ (mJ/mm$^2$) is defined as $Ua=PW/(Vc\times PL)$, using the beam power $PW$ (W) of the laser beam or the electron beam, the scanning speed $Vc$ (m/s) of the laser beam or the electron beam in the transverse direction (direction parallel to the TD axis), and the beam irradiation interval $PL$ (mm) in the rolling direction (direction parallel to the RD axis);

$$1.0 \leq Ua \leq 5.0 \quad \text{Formula (207)}$$

In a case where the average irradiation energy density $Ua$ is less than 1.0, sufficient thermal strains cannot be introduced into the tension-applying insulation coating, which is not preferable. On the other hand, in a case where the average irradiation energy density $Ua$ exceeds 5.0, the surplus strain amount becomes too large, and as a result, the magnetostriction decreases, which is not preferable. The average irradiation energy density $Ua$ is preferably 1.3 mJ/mm$^2$ or more, more preferably 1.7 mJ/mm$^2$ or more, and even more preferably 2.0 mJ/mm$^2$ or more. In addition, the average irradiation energy density $Ua$ is preferably 4.5 mJ/mm$^2$ or less, more preferably 4.0 mJ/mm$^2$ or less, and even more preferably 3.0 mJ/mm$^2$ or less.

As shown in the above definition formula, the average irradiation energy density $Ua$ can be controlled to a desired value by changing at least any of the beam power $PW$ (W), the beam scanning speed $Vc$ (m/s) in the transverse direction, and the beam irradiation interval $PL$ (mm) in the rolling direction. In this case, in order to change the beam scanning speed $Vc$ and the beam irradiation interval $PL$, it is necessary to change the line speed of the production line of the grain-oriented electrical steel sheet (continuous operation line for the magnetic domain refining step). Therefore, there are cases where the control of the average irradiation energy density while maintaining productivity is complicated. Therefore, when the value of the average irradiation energy density $Ua$ is changed, it is preferable to first consider changing the beam power $PW$ which does not require a change in the line speed.

Furthermore, in the magnetic domain refining step according to the present embodiment, when thermal strain is introduced to the surface of the tension-applying insulation coating, the beam shape of the laser beam or the electron beam on the surface of the tension-applying insulation coating may be circular or elliptical.

A laser beam device or an electron beam device used in the magnetic domain refining step is not particularly limited, and various known devices can be appropriately used.

Through the steps described above, the grain-oriented electrical steel sheet according to the present embodiment can be produced.

Hereinabove, the method for producing a grain-oriented electrical steel sheet according to the present embodiment, has been described in detail.

EXAMPLES

Hereinafter the technical contents of the present invention will be further described with reference to examples and comparative examples. The conditions of the following examples are condition examples adopted to confirm the feasibility and effects of the present invention, and the present invention is not limited to these condition examples. Furthermore, the present invention may adopt various conditions as long as the object of the present invention is achieved without departing from the gist of the present invention.

Experimental Example 1

A steel piece containing the compositions shown in Table 1 below was produced, heated to 1350° C., and subjected to hot rolling to obtain a hot-rolled steel sheet having a sheet thickness of 2.3 mm. In each steel piece, the remainder other than the compositions described in Table 1 was Fe and impurities.

Thereafter, the hot-rolled steel sheet was annealed at 900 to 1200'C and then cold-rolled to obtain a cold-rolled steel sheet having a sheet thickness of 0.19 to 0.22 mm.

The cold-rolled steel sheet was subjected to decarburization annealing, thereafter coated with an annealing separating agent consisting of magnesia (MgO), and subjected to final annealing at 1200° C. to produce a finale-annealed sheet.

The chemical composition of the base steel sheet of the final-annealed sheet was as shown in Table 2 for Si, C, and nitrogen (N), and was less than 10 ppm and less than 5 ppm for acid-soluble aluminum (Sol. Al) and sulfur (S), respectively. The other elements had the same amounts as in the case of the steel pieces.

TABLE 1

| | Steel No. | Chemical composition (mass %, remainder is Fe and impurities) | | | | | | | | | | | |
|---|---|---|---|---|---|---|---|---|---|---|---|---|---|
| | | C | Si | sol-Al | N | Mn | S | P | Sn | Cr | Cu | Bi | Se | Sb |
| Invention Steel | A1 | 0.032 | 3.21 | 0.019 | 0.011 | 0.150 | 0.015 | 0.001 | 0.008 | — | — | — | — | — |
| | A2 | 0.035 | 3.23 | 0.018 | 0.012 | 0.110 | 0.015 | — | 0.480 | — | — | — | — | — |
| | A3 | 0.035 | 3.25 | 0.019 | 0.016 | 0.120 | 0.022 | 0.022 | — | 0.009 | — | — | — | — |
| | A4 | 0.033 | 3.25 | 0.055 | 0.018 | 0.130 | 0.023 | 0.023 | — | 0.490 | — | — | — | — |
| | A5 | 0.037 | 3.55 | 0.065 | 0 016 | 0.110 | 0.035 | 0.008 | — | — | 0.008 | — | — | — |
| | A6 | 0.036 | 3.27 | 0.051 | 0.018 | 0.140 | 0.037 | — | — | — | 0.960 | — | — | — |
| | A7 | 0.035 | 3.26 | 0.022 | 0.006 | 0.053 | 0.032 | 0.008 | — | — | — | — | — | — |
| | A8 | 0.081 | 3.23 | 0.027 | 0.008 | 0.070 | 0.022 | 0.010 | — | — | — | — | — | — |
| | A9 | 0.078 | 3.34 | 0.029 | 0.007 | 0.091 | 0.035 | 0.010 | 0.330 | — | 0 480 | — | — | — |
| | A10 | 0.073 | 3.32 | 0.023 | 0.007 | 0.067 | 0.022 | 0.013 | — | 0.050 | 0.080 | 0.001 | — | — |
| | A11 | 0.033 | 3.51 | 0.034 | 0.002 | 0.051 | 0.035 | 0.018 | — | — | — | 0.010 | 0.006 | — |
| | A12 | 0.033 | 3.55 | 0.035 | 0.008 | 0.073 | 0.035 | 0.018 | — | — | 0.080 | — | — | — |
| | A13 | 0.075 | 3.35 | 0.024 | 0.009 | 0.072 | 0.026 | 0.025 | 0.045 | 0.120 | — | — | 0.003 | — |
| | A14 | 0.085 | 3.31 | 0.027 | 0.009 | 0.072 | 0.011 | 0.025 | 0.110 | 0.050 | 0 088 | 0.001 | — | — |
| | A15 | 0.075 | 3.35 | 0.024 | 0.009 | 0.072 | 0.025 | 0.025 | — | 0.040 | 0.070 | — | 0.005 | 0.01 |
| | A16 | 0.072 | 3.31 | 0.027 | 0.009 | 0.072 | 0.022 | 0.021 | 0.010 | 0.040 | 0.070 | — | 0.005 | 0.10 |
| Comparative Steel | a1 | 0.008 | 3.25 | 0.021 | 0 009 | 0.050 | 0.015 | 0.005 | — | — | — | — | — | — |
| | a2 | 0.209 | 3.13 | 0.033 | 0.006 | 0.030 | 0.016 | 0.006 | — | — | — | — | — | — |
| | a3 | 0.044 | 2.43 | 0.045 | 0.008 | 0.030 | 0.014 | 0.008 | — | — | — | — | — | — |
| | a4 | 0.045 | 4.05 | 0.023 | 0.009 | 0.040 | 0.007 | 0.009 | — | — | — | — | — | — |
| | a5 | 0.055 | 3.15 | 0.009 | 0.009 | 0.040 | 0.009 | 0.004 | — | — | — | — | — | — |
| | a6 | 0.065 | 3.08 | 0.075 | 0.004 | 0.350 | 0.055 | — | — | — | — | — | — | — |
| | a7 | 0.045 | 3.15 | 0.025 | 0.023 | 0.440 | 0.041 | — | — | — | — | — | — | — |
| | a8 | 0.032 | 3.28 | 0.045 | 0.006 | 0.008 | 0 065 | 0.022 | — | — | — | — | — | — |
| | a9 | 0.068 | 3.34 | 0.033 | 0.004 | 0.510 | 0.023 | 0.029 | — | — | — | — | — | — |
| | a10 | 0.067 | 3.36 | 0.025 | 0.009 | 0 410 | 0.004 | — | — | — | — | — | — | — |
| | a11 | 0.068 | 3.37 | 0.019 | 0.005 | 0.230 | 0.085 | — | — | — | — | — | — | — |
| | a12 | 0.069 | 3.29 | 0.020 | 0.006 | 0.185 | 0.013 | 0.041 | — | — | — | — | — | — |

Table 2 below shows various conditions of the decarburization annealing step in the present experimental example.

In the temperature raising step of the decarburization annealing step, the temperature rising rate S0 in the temperature range of 600° C. or higher and 800° C. or lower was set to 700° C./sec, and the temperature rising rate S1 in the temperature range of 700° C. to 800° C. was set to 1000° C./sec. The oxygen potential P0 in the temperature range of 600° C. or higher and 800° C. or lower was set to 0.01. In the temperature raising step of the decarburization annealing step, the temperature rising rate S1 in the temperature range of 500° C. or higher and lower than 600° C. was set to 1200° C./sec, and the oxygen potential P1 in the temperature range of 500° C. or higher and lower than 600° C. was set to 0.01.

Furthermore, in the soaking step of the decarburization annealing step, holding was performed in a wet hydrogen atmosphere with an oxygen potential ($P_{H_2O}/P_{H_2}$) of 0.4 at an annealing temperature of 810° C. for about 120 seconds. All of these conditions fall within the scope of the present invention.

The surface of the obtained steel sheet having a size of 60 mm in the transverse direction and 300 mm in the rolling direction (more specifically, the surface of the glass coating) was coated with a coating solution for forming an insulation coating primarily containing a metal phosphate and baked to form a tension-applying insulation coating, whereby a grain-oriented electrical steel sheet was obtained. In order to remove the strain introduced with the formation of the insulation coating, after forming the tension-applying insulation coating, the above-described gain-oriented electrical steel sheet having a size of 60 mm in the transverse direction and 300 mm in the rolling direction was subjected to stress relieving annealing in a dry nitrogen atmosphere at 800° C. for 2 to 4 hours.

Thereafter, magnetic domain control was performed by performing a magnetic domain refining treatment using a laser on the surface of the steel sheet after the stress relieving annealing (more specifically, the surface of the tension-applying insulation coating). In the magnetic domain refining treatment, using a continuous-wave laser beam device, the average irradiation energy density Ua was set to 2.0 mJ/mm², and the beam shape on the surface of the steel sheet was set to an elliptical shape having an aspect ratio (dl/dc) of 0.02. Furthermore, continuous-wave laser beam irradiation conditions were controlled such that the width W of thermal strains as the introduced line width of the thermal strains became 100 μm±20 μm when observed with a magnetic domain SEM and the irradiation pitch p became an interval of 6 mm. In addition, the magnitude of the angle φ shown in FIG. 3 was controlled to be 3°.

For each of the obtained grain-oriented electrical steel sheets, the magnetic domain structure obtained by a reflected electron image was measured using a magnetic domain SEM (manufactured by JEOL Ltd.), and a surplus strain amount (F1−F2)/F2 was measured using an XRD (SmartLab, manufactured by RIGAKU) using Co Kα radiation as a radiation source by the method described above. Furthermore, for each of the obtained grain-oriented electrical steel sheets, the magnetic characteristics (magnetic flux density) and magnetostriction were evaluated by the following methods. The orientation of secondary recrystallization was analyzed by a Laue diffractometer (manufactured by RIGAKU) using X-rays. However, in a case where the magnetic flux density was less than 1.80 T, the orientation of the secondary recrystallization could not be accurately measured, so that the orientation analysis of the secondary recrystallization was not performed.

<Magnetic Flux Density>

Regarding the magnetic flux density, a sample having a size of 60 mm in the transverse direction and 300 mm in the rolling direction was taken, and the magnetic flux density B8 of this sample was evaluated by a single sheet magnetic characteristic measurement method (SST) described in JIS C 2556 (2011). In each case, after forming the tension-applying insulation coating and before controlling magnetic domains by laser, stress relieving annealing was performed in a dry nitrogen atmosphere at 800° C. for 2 to 4 hours.

B8 is a magnetic flux density at a magnetic field strength of 800 A/m, and is used as a criterion for determining the quality of secondary recrystallization. A value of B8=1.89T or more was determined as having undergone secondary recrystallization and thus acceptable, and a value of less than B8=1.89T was determined as having not undergone secondary recrystallization and thus unacceptable. Magnetic characteristics (magnetic flux densities) of the samples that were fractured in the hot rolling step or the cold rolling step were not evaluated (in Table 2 shown below, indicated by "-").

<Magnetostriction>

Regarding magnetostriction, a sample having a size of 60 mm in the transverse direction and 300 mm in the rolling direction was taken from the grain-oriented electrical steel sheet of the present invention provided with a tension-applying insulation coating subjected to laser magnetic domain control, and the sample was measured by an alternating current magnetostriction measurement method using the magnetostriction measurement device described in Patent Document 8 above. The obtained measured value regarding magnetostriction is used as an evaluation value indicating the noise characteristics of the grain-oriented electrical steel sheet, and the noise characteristics were evaluated according to the following criteria, and the noise characteristics were evaluated according to the following criteria. However, in a case where the magnetic characteristics did not meet the target, the noise characteristics were not evaluated.

For the noise characteristics, the magnetostriction velocity level (LVA) was used. As described in Patent Document 9, the calculation method was to determine the amplitude Cn of each frequency component fn by Fourier analysis of a magnetostrictive signal (n is an index of each frequency component). Next, using an A correction coefficient αn of each frequency component, LVA was derived by integrating of n. That is, LVA was determined by the following formula.

$$LVA = 20 \times \log(\sqrt{(\Sigma(\rho pc \times 2\pi \times fn \times \alpha n \times Cn/\sqrt{2})^2)}/Pe0)(dB)$$

In a level of F or more, preferable noise characteristics were obtained.

EX (Excellent): less than 50.0 dBA: A particularly good effect is recognized.

VG (very Good): 50.0 or more to less than 52.5 dBA: A good effect is recognized.

G (Good): 52.5 or more to less than 55.0 dBA: A relatively good effect is recognized.

F (Fine): 55.0 or more and less than 60.0 dBA: An effect is recognized.

B (Bad): 60.0 dBA or more: No effect is recognized.

The obtained results are shown in Table 2 below.

TABLE 2

| | Symbol | Steel No. | C content (mass ppm) | Si content (mass %) | N content (mass ppm) | Surplus strain amount (F1 − F2)/F2 | Crystal orientation (deg) γ | Crystal orientation (deg) $(\alpha^2 + \beta^2)^{0.5}$ | Sheet thickness alter cold rolling (min) | Noise characteristics | Magnetic flux den site B8 (T) |
|---|---|---|---|---|---|---|---|---|---|---|---|
| Invention Example | B1 | A1 | 20 | 3.15 | 9 | 0.08 | 5.4 | 6.5 | 0.22 | F | 1.91 |
| | B2 | A2 | 15 | 3.11 | 10 | 0.11 | 2.0 | 7.2 | 0.22 | F | 1.89 |
| | B3 | A3 | 10 | 3.12 | 10 | 0.10 | 2.2 | 7.6 | 0.22 | F | 1.89 |
| | B4 | A4 | 20 | 3.12 | 12 | 0.09 | 7.8 | 8.5 | 0.22 | F | 1.89 |
| | B5 | A5 | 16 | 3.40 | 11 | 0.08 | 6.5 | 8.6 | 0.22 | F | 1.89 |
| | B6 | A6 | 15 | 3.15 | 10 | 0.07 | 7.5 | 8.5 | 0.22 | F | 1.89 |
| | B7 | A7 | 18 | 3.13 | 10 | 0.06 | 2.8 | 7.6 | 0.22 | G | 1.89 |
| | B8 | A8 | 10 | 3.10 | 12 | 0.07 | 3.5 | 7.8 | 0.22 | G | 1.89 |
| | B9 | A9 | 8 | 3.22 | 13 | 0.09 | 3.5 | 7.2 | 0.22 | G | 1.89 |
| | B10 | A10 | 19 | 3.24 | 15 | 0.08 | 4.2 | 8.5 | 0.22 | G | 1.89 |
| | B11 | A11 | 16 | 3.39 | 9 | 0.07 | 4 5 | 6.3 | 0.22 | G | 1.91 |
| | B12 | A12 | 17 | 3.41 | 15 | 0.06 | 4 2 | 8.5 | 0.22 | G | 1.89 |
| | B13 | A13 | 18 | 3.22 | 10 | 0.12 | 3.2 | 8.4 | 0.22 | G | 1.89 |
| | B14 | A14 | 14 | 3.18 | 15 | 0.13 | 3.9 | 7.6 | 0.22 | G | 1.89 |
| | B15 | A15 | 17 | 3.25 | 12 | 0.09 | 4.5 | 8.6 | 0.22 | G | 1.89 |
| | B16 | A16 | 19 | 3.19 | 15 | 0.08 | 3.3 | 7.2 | 0.22 | G | 1.89 |
| | B17 | A1 | 17 | 3.09 | 10 | 0.08 | 2.8 | 6.1 | 0.19 | G | 1.91 |
| | B18 | A2 | 17 | 3.13 | 9 | 0.10 | 4.3 | 7.4 | 0.19 | G | 1.89 |
| | B19 | A3 | 15 | 3.11 | 9 | 0.10 | 3.5 | 6.6 | 0.19 | G | 1.91 |
| | B20 | A4 | 14 | 3.15 | 12 | 0 11 | 3.5 | 7.1 | 0.19 | G | 1.89 |
| | B21 | A5 | 17 | 3.43 | 12 | 0.12 | 4.2 | 4.2 | 0.19 | G | 1.96 |
| | B22 | A6 | 18 | 3.16 | 10 | 0.11 | 2.9 | 4.3 | 0.19 | G | 1.96 |
| | B23 | A7 | 15 | 3.19 | 10 | 0.11 | 4 1 | 5.1 | 0.19 | G | 1.93 |
| | B24 | A8 | 15 | 3.19 | 9 | 0.11 | 4.0 | 5.5 | 0.19 | G | 1.93 |
| | B25 | A9 | 12 | 3.21 | 9 | 0.09 | 2.8 | 4.5 | 0.19 | G | 1.95 |
| | B26 | A10 | 25 | 3.22 | 8 | 0.08 | 4.2 | 4.2 | 0.19 | G | 1.97 |
| | B27 | A11 | 25 | 3.38 | 9 | 0.07 | 4.3 | 4.6 | 0.19 | G | 1.95 |
| | B28 | A12 | 23 | 3.41 | 12 | 0.09 | 3.6 | 4.8 | 0.19 | G | 1.96 |
| | B29 | A13 | 17 | 3.25 | 10 | 0 12 | 3.9 | 4.5 | 0.19 | G | 1.95 |
| | B30 | A14 | 15 | 3.22 | 13 | 0.11 | 4.1 | 4.2 | 0.19 | G | 1.95 |
| | B31 | A15 | 16 | 3.21 | 10 | 0.12 | 4.2 | 4.8 | 0.19 | G | 1.95 |
| | B32 | A16 | 15 | 3.20 | 14 | 0.13 | 2.9 | 4.5 | 0.19 | G | 1.94 |
| Comparative Example | b1 | a1 | 19 | 3.11 | 11 | 0.18 | — | — | 0.22 | — | 1.65 |
| | b2 | a2 | 20 | 3.05 | 12 | 0.25 | — | — | 0.22 | — | 1.71 |
| | b3 | a3 | 19 | 2.33 | 12 | 0.25 | — | — | 0.22 | — | 1.66 |
| | b4 | a4 | — | 3.95 | 9 | — | — | — | — | — | — |
| | b5 | a5 | 16 | 3.01 | 10 | 0.31 | — | — | 0.22 | — | 1.59 |
| | b6 | a6 | — | 2.94 | 10 | — | — | — | — | — | — |
| | b7 | a7 | — | 3.01 | 52 | — | — | — | — | — | — |

TABLE 2-continued

| Symbol | Steel No. | C content (mass ppm) | Si content (mass %) | N content (mass ppm) | Surplus strain amount (F1 − F2)/F2 | Crystal orientation (deg) γ | Crystal orientation (deg) $(\alpha^2 + \beta^2)^{0.5}$ | Sheet thickness alter cold rolling (min) | Noise characteristics | Magnetic flux den site B8 (T) |
|---|---|---|---|---|---|---|---|---|---|---|
| b8  | a8  | 10 | 3.14 | 13 | 0.24 | — | — | 0.22 | — | 1.74 |
| b9  | a9  | 20 | 3.25 | 9  | 0.41 | — | — | 0.22 | — | 1.72 |
| b10 | a10 | 20 | 3.19 | 8  | 0.35 | — | — | 0.22 | — | 1.75 |
| b11 | a11 | —  | 3.21 | 9  | —    | — | — | —    | — | —    |
| b12 | a12 | —  | 3.13 | 11 | —    | — | — | —    | — | —    |

As is clear from Table 2, all of Invention Steels B1 to B32 exhibited excellent magnetic characteristics and noise characteristics. On the other hand, in Comparative Steels b1 to b12 in which the amounts of some essential elements were out of the ranges of the present invention, sufficient magnetic characteristics could not be obtained, or, fracture had occurred (b4, b6, b7, b11, and b12) during the rolling (hot rolling or cold rolling).

Experimental Example 2

A steel piece containing the elements shown hi above Table 1 was produced, heated to 1350° C., and subjected to hot rolling to obtain a hot-rolled steel sheet having a sheet thickness of 2.3 mm. Thereafter, the hot-rolled steel sheet was annealed at 900 to 1200° C. and then cold-rolled to obtain a cold-rolled steel sheet having a sheet thickness of 0.19 to 0.22 mm. The cold-rolled steel sheet was subjected to decarburization annealing, thereafter coated with an annealing separating agent made of magnesia (MgO), and subjected to final annealing at 1200° C. to produce a final-annealed sheet. The chemical composition of the base steel sheet after the final annealing was as shown in Table 2 for Si, C and N, and was less than 10 ppm and less than 5 ppm for acid-soluble aluminum (Sol. Al) and sulfur (S), respectively. The other elements had the same amounts as in the case of the steel pieces.

In the decarburization annealing step in the present experimental example, temperature raising and soaking were performed under the conditions shown in Table 3. Further, the maximum attainment temperature during the temperature raising was 850° C. or higher. In the soaking step, the ratio between the soaking time of the first soaking step and the soaking time of the second soaking step (the soaking time of the first soaking step/the soaking time of the second soaking step) was controlled in a range of 0.5 to 15.0.

The surface of the obtained steel sheet was coated with a coating solution for forming an insulation coating primarily containing a metal phosphate and baked to form a tension-applying insulation coating, whereby a grain-oriented electrical steel sheet was obtained.

Thereafter, magnetic domain control was performed by performing a magnetic domain refining treatment using a laser on the surface of the obtained steel sheet (more specifically, the surface of the tension-applying insulation coating). In the magnetic domain refining treatment, using a continuous-wave laser beam device, the average irradiation energy density Ua was set to 2.5 mJ/mm$^2$, and the beam shape on the surface of the steel sheet was set to an elliptical shape having an aspect ratio (dl/dc) of 0.02. Furthermore, continuous-wave laser beam irradiation conditions were controlled such that the width W of thermal strains as the introduced line width of the thermal strains became 100 μm±20 μm when observed with a magnetic domain SEM and the irradiation pitch p became an interval of 5 mm. In addition, the magnitude of the angle φ shown in FIG. 3 was controlled to be 3°.

For each of the obtained grain-oriented electrical steel sheets, various characteristics were evaluated in the same manner as in Experimental Example 1, and the obtained results are shown in Table 3 below.

TABLE 3A

| | No. | Steel No. | C content (mass ppm) | Si content (mass %) | N content (mass ppm) | Decarburization annealing step Temperature raising step | | | | |
|---|---|---|---|---|---|---|---|---|---|---|
| | | | | | | S1 (° C./s) | P1 (—) | S0 (° C./s) | S01 (° C./s) | P0 (—) |
| Invention Example | F2  | A7  | 16 | 3.13 | 8  | 800  | 0.65  | 2200 | 2000 | 0.01 |
| | F3  | A7  | 18 | 3.15 | 8  | 700  | 0.42  | 2200 | 2000 | 0.01 |
| | F5  | A7  | 22 | 3.12 | 8  | 700  | 0.01  | 2200 | 2000 | 0.01 |
| | F7  | A8  | 19 | 3.11 | 9  | 900  | 0.59  | 1000 | 1000 | 0 01 |
| | F8  | A8  | 18 | 3.11 | 10 | 500  | 0.33  | 1000 | 1000 | 0.01 |
| | F10 | A8  | 17 | 3.15 | 12 | 700  | 0.02  | 1000 | 1000 | 0.01 |
| | F12 | A9  | 18 | 3.21 | 12 | 1200 | 0.53  | 1100 | 800  | 0.01 |
| | F13 | A9  | 19 | 3.22 | 10 | 500  | 0.45  | 1100 | 800  | 0.01 |
| | F15 | A9  | 8  | 3.23 | 10 | 500  | 0.01  | 1100 | 800  | 0.01 |
| | F17 | A10 | 19 | 3.22 | 13 | 1500 | 0.67  | 800  | 1000 | 0.01 |
| | F18 | A10 | 12 | 3.22 | 12 | 650  | 0.48  | 800  | 1000 | 0 01 |
| | F20 | A10 | 10 | 3.21 | 10 | 450  | 0.005 | 800  | 1000 | 0.01 |
| | F22 | A11 | 13 | 3.40 | 10 | 1200 | 0.62  | 1000 | 1200 | 0.01 |
| | F23 | A11 | 17 | 3.41 | 9  | 600  | 0.44  | 1000 | 1200 | 0.01 |
| | F25 | A11 | 10 | 3.39 | 8  | 600  | 0.003 | 1000 | 1200 | 0.01 |
| | F27 | A12 | 23 | 3.40 | 12 | 1300 | 0.65  | 1500 | 1000 | 0.01 |
| | F28 | A12 | 6  | 3.41 | 12 | 450  | 0.43  | 1500 | 1000 | 0.01 |

TABLE 3A-continued

|  |  | No. |  |  |  |  |  |  |  |  |
|---|---|---|---|---|---|---|---|---|---|---|
|  |  | F30 | A12 | 17 | 3.40 | 10 | 650 | 0.0004 | 1500 | 1000 | 0.01 |
|  |  | F32 | A13 | 15 | 3.25 | 10 | 1400 | 0.65 | 700 | 700 | 0.01 |
|  |  | F33 | A13 | 20 | 3.25 | 11 | 480 | 0.41 | 700 | 700 | 0.01 |
|  |  | F35 | A13 | 12 | 3.23 | 13 | 510 | 0.01 | 700 | 700 | 0.01 |
|  |  | F37 | A14 | 20 | 3.21 | 9 | 1200 | 0.66 | 1200 | 1200 | 0.01 |
|  |  | F38 | A14 | 21 | 3.21 | 8 | 500 | 0.32 | 1200 | 1200 | 0.01 |
|  |  | F40 | A14 | 17 | 3.20 | 9 | 600 | 0.01 | 1200 | 1200 | 0.01 |
|  |  | F42 | A15 | 15 | 3.20 | 12 | 1100 | 0.68 | 1500 | 1800 | 0.01 |
|  |  | F43 | A15 | 20 | 3.20 | 10 | 400 | 0.38 | 1500 | 1800 | 0.01 |
| Comparative | f1 | A2 | 18 | 3.15 | 10 | 350 | 0.02 | 2600 | 700 | 0 01 |
| Example | f2 | A2 | 16 | 3.15 | 12 | 350 | 0.02 | 380 | 700 | 0.01 |
|  | f3 | A2 | 5 | 3.13 | 12 | 350 | 0.02 | 700 | 700 | 0.20 |
|  | f5 | A12 | 17 | 3.41 | 10 | 350 | 0.4 | 700 | 1000 | 0.01 |
|  | f6 | A12 | 15 | 3.41 | 10 | 700 | 0.4 | 1000 | 1000 | 0 01 |
|  | f7 | A12 | 15 | 3.42 | 15 | 700 | 0.4 | 1000 | 1300 | 0.01 |
|  | f8 | A12 | 12 | 3.40 | 10 | 700 | 0.4 | 1000 | 1300 | 0.01 |
|  | f9 | A14 | 18 | 3.25 | 13 | 700 | 0.4 | 1300 | 1300 | 0.01 |
|  | f10 | A14 | 19 | 3.25 | 12 | 1000 | 0.005 | 1300 | 1600 | 0.01 |
|  | f11 | A15 | 13 | 3.23 | 10 | 1000 | 0.005 | 1300 | 1600 | 0.01 |
|  | f12 | A15 | 8 | 3.22 | 13 | 1000 | 0.005 | 1800 | 1600 | 0.01 |
|  | f13 | A16 | 12 | 3.25 | 9 | 1000 | 0.005 | 1800 | 2000 | 0.01 |
|  | f14 | A16 | 10 | 3.21 | 12 | 1000 | 0.005 | 1800 | 2000 | 0.01 |

| | | | Decarburization annealing step Soaking step | | | | | |
|---|---|---|---|---|---|---|---|---|
| | | | First soaking step | | | Second soaking step | | First soaking time/ |
| | | No. | T2 (° C.) | Retention time (s) | P2 (—) | T3 (° C.) | Retention time (s) | P3 (—) | second soaking time (—) |
|---|---|---|---|---|---|---|---|---|
| Invention | | F2 | 780 | 60 | 0.20 | 880 | 90 | 0.003 | 0.7 |
| Example | | F3 | 780 | 60 | 0.20 | 880 | 90 | 0.003 | 0.7 |
| | | F5 | 780 | 60 | 0.20 | 880 | 90 | 0.003 | 0.7 |
| | | F7 | 820 | 130 | 0.20 | 930 | 10 | 0.003 | 13.0 |
| | | F8 | 820 | 130 | 0.20 | 930 | 10 | 0.003 | 13.0 |
| | | F10 | 820 | 130 | 0.20 | 930 | 10 | 0.003 | 13.0 |
| | | F12 | 780 | 220 | 0.20 | 880 | 90 | 0.003 | 2.4 |
| | | F13 | 780 | 220 | 0.20 | 880 | 90 | 0.003 | 2.4 |
| | | F15 | 780 | 220 | 0.20 | 880 | 90 | 0.003 | 2.4 |
| | | F17 | 810 | 50 | 0.50 | 950 | 15 | 0.01 | 3.3 |
| | | F18 | 810 | 50 | 0.50 | 950 | 15 | 0.01 | 3.3 |
| | | F20 | 810 | 50 | 0.50 | 950 | 15 | 0.01 | 3.3 |
| | | F22 | 810 | 150 | 0.50 | 950 | 15 | 0.01 | 10.0 |
| | | F23 | 810 | 150 | 0.50 | 950 | 15 | 0.01 | 10.0 |
| | | F25 | 810 | 150 | 0.50 | 950 | 15 | 0.01 | 10.0 |
| | | F27 | 810 | 200 | 0.50 | 950 | 15 | 0.01 | 13.3 |
| | | F28 | 810 | 200 | 0.50 | 950 | 15 | 0.01 | 13.3 |
| | | F30 | 810 | 200 | 0.50 | 950 | 15 | 0.01 | 13.3 |
| | | F32 | 860 | 120 | 0.80 | 990 | 30 | 0.40 | 4.0 |
| | | F33 | 860 | 120 | 0.80 | 990 | 30 | 0.40 | 4.0 |
| | | F35 | 860 | 120 | 0.80 | 990 | 30 | 0.40 | 4.0 |
| | | F37 | 810 | 170 | 0.80 | 950 | 15 | 0.40 | 11.3 |
| | | F38 | 810 | 170 | 0.80 | 950 | 15 | 0.40 | 11.3 |
| | | F40 | 810 | 170 | 0.80 | 950 | 15 | 0.40 | 11.3 |
| | | F42 | 860 | 260 | 0.80 | 990 | 60 | 0.40 | 4.3 |
| | | F43 | 860 | 260 | 0.80 | 990 | 60 | 0.40 | 4.3 |
| Comparative | | f1 | 800 | 100 | 0.30 | 990 | 30 | 0.10 | 3.3 |
| Example | | f2 | 800 | 100 | 0.30 | 990 | 30 | 0.10 | 3.3 |
| | | f3 | 800 | 100 | 0.30 | 990 | 30 | 0.10 | 3.3 |
| | | f5 | 920 | 100 | 0.30 | 990 | 10 | 0.10 | 10.0 |
| | | f6 | 690 | 100 | 0.30 | 950 | 10 | 0.20 | 10.0 |
| | | f7 | 850 | 9 | 0.30 | 950 | 10 | 0.20 | 0.9 |
| | | f8 | 850 | 150 | 1.50 | 950 | 10 | 0.20 | 15.0 |
| | | f9 | 850 | 150 | 0.10 | 950 | 60 | 0.05 | 2.5 |
| | | f10 | 850 | 150 | 0.50 | 1020 | 60 | 0.05 | 2.5 |
| | | f11 | 810 | 150 | 0.50 | 810 | 60 | 0.05 | 2.5 |
| | | f12 | 810 | 250 | 0.50 | 900 | 520 | 0.30 | 0.5 |
| | | f13 | 810 | 250 | 0.50 | 900 | 3 | 0.30 | 83.3 |
| | | f14 | 810 | 250 | 0.50 | 900 | 60 | 0.60 | 4.2 |

TABLE 3B

|  | No. | Surplus strain amount (F1 − F2)/F2 | Crystal orientation (deg) γ | Crystal orientation (deg) $(\alpha^2 + \beta^2)^{0.5}$ | Sheet thickness after cold rolling (mm) | Noise characteristics | Magnetic flux density B8 (T) |
|---|---|---|---|---|---|---|---|
| Invention Example | F2 | 0.12 | 4.3 | 7.2 | 0.22 | G | 1.89 |
|  | F3 | 0.08 | 4.5 | 4.5 | 0.22 | G | 1.91 |
|  | F5 | 0.03 | 4.8 | 2.5 | 0.22 | VG | 1.92 |
|  | F7 | 0.12 | 4.6 | 6.3 | 0.22 | G | 1.96 |
|  | F8 | 0.11 | 4.5 | 4.3 | 0.22 | G | 1.95 |
|  | F10 | 0.04 | 3.9 | 2.2 | 0.22 | VG | 1.96 |
|  | F12 | 0.07 | 2.9 | 7.1 | 0.19 | G | 1.89 |
|  | F13 | 0.04 | 3.2 | 3.6 | 0.19 | VG | 1.94 |
|  | F15 | 0.03 | 2.7 | 2.1 | 0.19 | EX | 1.94 |
|  | F17 | 0.15 | 4.1 | 8.1 | 0.22 | G | 1.89 |
|  | F18 | 0.03 | 3.6 | 3.3 | 0.22 | VG | 1.94 |
|  | F20 | 0.02 | 3.1 | 1.8 | 0.22 | VG | 1.94 |
|  | F22 | 0.09 | 4.8 | 5.8 | 0.22 | G | 1.95 |
|  | F23 | 0.04 | 4.2 | 3.1 | 0.22 | VG | 1.96 |
|  | F25 | 0.04 | 2.8 | 1.4 | 0.22 | VG | 1.95 |
|  | F27 | 0.11 | 3.3 | 5.2 | 0.19 | G | 1.95 |
|  | F28 | 0.04 | 2.8 | 3.5 | 0.19 | VG | 1.96 |
|  | F30 | 0.03 | 3.8 | 2.0 | 0.19 | EX | 1.97 |
|  | F32 | 0.11 | 3.6 | 7.0 | 0.22 | G | 1.91 |
|  | F33 | 0.03 | 3.5 | 3.0 | 0.22 | VG | 1.94 |
|  | F35 | 0.05 | 2.7 | 1.7 | 0.22 | VG | 1.94 |
|  | F37 | 0.12 | 3.5 | 5.1 | 0.22 | G | 1.95 |
|  | F38 | 0.02 | 2.8 | 3.6 | 0.22 | VG | 1.96 |
|  | F40 | 0.04 | 4.6 | 1.4 | 0.22 | VG | 1.96 |
|  | F42 | 0.09 | 3.5 | 6.2 | 0.19 | G | 1.91 |
|  | F43 | 0.03 | 3.3 | 3.0 | 0.19 | VG | 1.94 |
| Comparative Example | f1 | — | — | — | 0.22 | — | 1.66 |
|  | f2 | 0.19 | 3.5 | 11.3 | 0.22 | B | 1.89 |
|  | f3 | 0.18 | 2.8 | 11.5 | 0.22 | B | 1.89 |
|  | f5 | — | — | — | 0.22 | — | 1.56 |
|  | f6 | — | 8.2 | 15.1 | 0.22 | — | 1.84 |
|  | f7 | — | — | — | 0.22 | — | 1.59 |
|  | f8 | — | 8.5 | 13.1 | 0.22 | — | 1.85 |
|  | f9 | — | 8.4 | 12.5 | 0.22 | — | 1.85 |
|  | f10 | — | — | — | 0.19 | — | 1.55 |
|  | f11 | — | 8.6 | 11.9 | 0.19 | — | 1.87 |
|  | f12 | — | — | — | 0.19 | — | 1.59 |
|  | f13 | — | 8.5 | 12.3 | 0.19 | — | 1.86 |
|  | f14 | — | 8.4 | 13.4 | 0.19 | — | 1.86 |

In Invention Steels F2, F7, F12, F17, F22, F27, F32, F37, and F42, since the oxygen potential P1 was out of the more preferable range of the present invention, the noise characteristics were evaluated as "G".

In Invention Steels F3, F5, F8, F10, F13, F15, F18, F20, F23, F25, F28, F30, F33, F35, F38, F40, and F43, the temperature rising rates S0 and S1, and oxygen potentials P0 and P1 were controlled within the ranges of the present invention. Therefore, better noise characteristic results were obtained compared to other invention steels. In particular, in F13, F15, F20, F25, F28, F30, F35, F40 and F43, the noise characteristics were evaluated as very good a "EX".

On the other hand, in f1 and f5 to f14 in which the producing method deviated from the range of the present invention, B8 did not meet the target. Therefore, the noise characteristics were not evaluated. In f2 and f3, although B8 met the target, the value of $(\alpha^2+\beta^2)^{0.5}$ exceeded the range of the invention, and the noise characteristics were inferior.

Experimental Example 3

A steel piece containing the elements shown in Table 1 above was produced, heated to 1350° C., and subjected to hot rolling to obtain a hot-rolled steel sheet having a sheet thickness of 2.3 mm. Thereafter, the hot-rolled steel sheet was annealed at 900 to 1200° C. and then cold-rolled to obtain a cold-rolled steel sheet having a sheet thickness of 0.19 to 0.22 mm. The cold-rolled steel sheet was subjected to decarburization annealing, thereafter coated with an annealing separating agent primarily containing magnesia (MgO), and subjected to final annealing at 200° C. to produce a final-annealed sheet.

In the decarburization annealing step in the present experimental example, the temperature rising rate S0 in the temperature range of 600° C. or higher and 800° C. or lower was set to 700° C./sec, and the oxygen potential P0 in the temperature range of 600° C. or higher and 800° C. or lower was set to 0.003. In addition, in the temperature raising step of the decarburization annealing step, the temperature rising rate S1 in the temperature range of 500° C. or higher and lower than 600° C. was set to 800° C./sec, and the oxygen potential P1 in the temperature range of 500° C. or higher and lower than 600° C. was set to 0.003. Furthermore, in the soaking step of the decarburization treatment step, holding was performed in a wet hydrogen atmosphere with an oxygen potential ($P_{H2O}/P_{H2}$) of 0.4, at an annealing temperature of 830° C. for about 100 seconds. All of these conditions fall within the scope of the present invention.

The surface of the obtained steel sheet was coated with a coating solution for forming an insulation coating primarily containing a metal phosphate and baked to form a tension-applying insulation coating, whereby a grain-oriented electrical steel sheet was obtained.

Thereafter, magnetic domain control was performed by performing a magnetic domain refining treatment miner a laser on the surface of the obtained steel sheet (more specifically, the surface of the tension-applying insulation coating). In the magnetic domain refining treatment, using a continuous-wave laser beam device, laser beam irradiation was performed on the surface of the steel sheet in a beam shape with the average irradiation energy density shown in Table 4. The irradiation conditions of the continuous-wave laser beam were controlled such that the irradiation pitch p became 5 mm and the angle φ became 1°. The aspect ratio (dl/dc) of each beam was set to 0.005.

For each of the obtained grain-oriented electrical steel sheets, various characteristics were evaluated in the same manner as in Experimental Example 1, and the obtained results are summarized in Table 4 below.

TABLE 4

| | No. | Steel No | C content (mass ppm) | Si content (mass %) | N content (mass ppm) | Beam irradiation condition Ua (mJ/mm$^2$) | Sheet thickness after cold rolling (mm) |
|---|---|---|---|---|---|---|---|
| Invention Example | D1 | A9 | 20 | 3.24 | 12 | 4.7 | 0.22 |
| | D2 | A9 | 15 | 3.28 | 9 | 4.2 | 0.22 |
| | D3 | A9 | 10 | 3.26 | 8 | 3.5 | 0.22 |
| | D4 | A9 | 13 | 3.21 | 12 | 2.5 | 0.22 |
| | D5 | A10 | 20 | 3.22 | 11 | 4.7 | 0.22 |
| | D6 | A10 | 16 | 3.20 | 15 | 4.2 | 0.22 |
| | D7 | A10 | 15 | 3.19 | 13 | 3.5 | 0.22 |
| | D8 | A10 | 14 | 3.25 | 11 | 2.5 | 0.22 |
| | D9 | A11 | 18 | 3.44 | 10 | 4.7 | 0.22 |
| | D10 | A11 | 10 | 3.52 | 12 | 4.2 | 0.22 |
| | D11 | A11 | 8 | 3.41 | 13 | 3.5 | 0.22 |
| | D12 | A11 | 17 | 3.41 | 13 | 2.5 | 0.22 |
| | D13 | A15 | 19 | 3.21 | 11 | 4.7 | 0.22 |
| | D14 | A15 | 16 | 3.20 | 8 | 4.2 | 0.22 |
| | D15 | A15 | 15 | 3.26 | 8 | 3.5 | 0.22 |
| | D16 | A15 | 17 | 3.25 | 7 | 2.5 | 0.22 |
| | D17 | A8 | 9 | 3.11 | 12 | 1.2 | 0.19 |
| | D18 | A8 | 10 | 3.19 | 9 | 1.4 | 0.19 |
| | D19 | A8 | 9 | 3.12 | 11 | 1.8 | 0.19 |
| | D20 | A8 | 14 | 3.11 | 9 | 2.3 | 0.19 |
| | D21 | A12 | 7 | 3.44 | 8 | 1.2 | 0.19 |
| | D22 | A12 | 10 | 3.26 | 8 | 1.4 | 0.19 |
| | D23 | A12 | 15 | 3.42 | 10 | 1.8 | 0.19 |
| | D24 | A12 | 15 | 3.44 | 12 | 2.3 | 0.19 |
| | D23 | A13 | 12 | 3.26 | 12 | 1.2 | 0.19 |
| | D26 | A13 | 11 | 3.26 | 13 | 1.4 | 0.19 |
| | D27 | A13 | 10 | 3.22 | 10 | 1.8 | 0.19 |
| | D28 | A13 | 8 | 3.24 | 9 | 2.3 | 0.19 |
| | D29 | A14 | 17 | 3.18 | 9 | 1.2 | 0.19 |
| | D30 | A14 | 15 | 3.19 | 10 | 1.4 | 0.19 |
| | D31 | A14 | 9 | 3.18 | 12 | 1.8 | 0.19 |
| | D32 | A14 | 15 | 3.20 | 12 | 2.3 | 0.19 |
| Comparative Example | d1 | A8 | 12 | 3.13 | 11 | 0.9 | 0.22 |
| | d2 | A8 | 10 | 3.13 | 11 | 5.5 | 0.22 |

| | No. | Surplus strain amount (F1 − F2)/F2 | Crystal orientation (deg) γ | Crystal orientation (deg) $(\alpha^2 + \beta^2)^{0.5}$ | Noise characteristics | Magnetic flux density B8 (T) |
|---|---|---|---|---|---|---|
| Invention Example | D1 | 0.08 | 5.5 | 6.5 | F | 1.91 |
| | D2 | 0.11 | 1.8 | 7.2 | F | 1.89 |
| | D3 | 0.10 | 5.5 | 7.6 | F | 1.89 |
| | D4 | 0.11 | 2.7 | 4.3 | G | 1.94 |
| | D5 | 0 09 | 6.2 | 8.5 | F | 1.89 |
| | D6 | 0.08 | 5.8 | 8.6 | F | 1.89 |
| | D7 | 0.07 | 2.2 | 8.5 | F | 1.89 |
| | D8 | 0 08 | 4.0 | 4.8 | G | 1.96 |
| | D9 | 0.06 | 5.7 | 7.6 | F | 1.89 |
| | D10 | 0.07 | 5.9 | 7.8 | F | 1.89 |
| | D11 | 0.09 | 2.4 | 7.2 | F | 1.89 |
| | D12 | 0.09 | 2.9 | 5.5 | G | 1.93 |
| | D13 | 0.08 | 5.3 | 8.5 | F | 1.89 |
| | D14 | 0 07 | 5.2 | 6.3 | F | 1.91 |
| | D15 | 0.12 | 5.1 | 5.8 | F | 1.03 |
| | D16 | 0.06 | 4.2 | 8.5 | G | 1.89 |
| | D17 | 0.08 | 6.0 | 6.1 | F | 1.91 |
| | D18 | 0.10 | 5.8 | 7.1 | F | 1.89 |
| | D19 | 0.10 | 7.2 | 6.6 | F | 1.91 |
| | D20 | 0.11 | 5.3 | 7.1 | F | 1.89 |
| | D21 | 0 12 | 7.6 | 4.2 | F | 1.95 |
| | D22 | 0.11 | 6.9 | 4.3 | F | 1.95 |
| | D23 | 0.11 | 6.2 | 5.1 | F | 1.93 |

TABLE 4-continued

|  |  |  |  |  |  |  |
|---|---|---|---|---|---|---|
|  | D24 | 0.11 | 7.3 | 5.5 | F | 1.93 |
|  | D25 | 0.09 | 1.5 | 4.5 | F | 1.97 |
|  | D26 | 0.08 | 1.5 | 4.2 | F | 1.95 |
|  | D27 | 0.07 | 1.7 | 4.6 | F | 1.96 |
|  | D28 | 0.09 | 2.2 | 4.8 | F | 1.95 |
|  | D29 | 0.12 | 5.2 | 4.5 | F | 1.94 |
|  | D30 | 0.11 | 6.3 | 4.2 | F | 1.95 |
|  | D31 | 0 12 | 7.1 | 4.8 | F | 1.96 |
|  | D32 | 0.13 | 5.9 | 4.5 | F | 1.95 |
| Comparative | d1 | 0.18 | 3.5 | 4.6 | B | 1.95 |
| Example | d2 | 0.19 | 4.2 | 4.9 | B | 1.95 |

In Invention Steels D4, D8, D12, and D16, since the average irradiation energy densities Ua were controlled within the preferable ranges of the present invention, compared to Invention Steels D1 to D3, D5 to D7, D9 to D 11, and D13 to D15, better noise characteristics evaluated as "G" were obtained.

In comparative Steels d1 acid d2 in which, the average irradiation energy densities Ua were out of the range of the present invention, the noise characteristics were evaluated as "B".

While the preferred embodiments of the present invention have been described in detail with reference to the accompanying drawings, but the present invention is not limited to such examples. It is obvious that those skilled in the art to which the present intention pertains can conceive various changes or modifications within the scope of the technical idea described in the claims, and it is understood that these also naturally belong to the technical scope of the present invention.

BRIEF DESCRIPTION OF THE REFERENCE SYMBOLS

10 Grain-oriented electrical steel sheet
11 Base steel sheet
13 Glass coating
15 Tension-applying insulation coating
21 Thermal strain

What is claimed is:

1. A grain-oriented electrical steel sheet comprising:
   a base steel sheet including, as a chemical composition, by mass %,
   C: 0.005% or less,
   Si: 2.50% to 4.00%,
   Mn: 0.010% to 0.500%,
   N: 0.010% or less,
   P: 0.0300% or less,
   Sol. Al: 0.005% or less,
   S: 0.010% or less,
   Bi: 0% to 0.020%,
   Sn: 0% to 0.500%,
   Cr: 0% to 0.500%,
   Cu: 0% to 1.000%,
   Se: 0% to 0.080%,
   Sb: 0% to 0.50%, and
   a remainder of Fe and impurities;
   a glass coating provided on a surface of the base steel sheet; and
   a tension-applying insulation coating provided on a surface of the glass coating,
   wherein linear thermal strains having a predetermined angle φ with respect to a transverse direction which is a direction orthogonal to a rolling direction are periodically formed on a surface of the tension-applying insulation coating at predetermined intervals along the rolling direction,
   wherein the surface of the tension-applying insulation coating having the linear thermal strains is measured by an X-ray diffraction spectrum using Co Kα radiation as a radiation source, for a full width at half maximum of a diffraction peak in a range of 2θ=52.38±0.50° corresponding to a {110} plane strength of Fe, the full width at half maximum F1 on the linear thermal strain and the full width at half maximum F2 at an intermediate position between two linear thermal strains adjacent to each other in units of ° satisfy the following Formula (1),
   wherein the linear thermal strains are observed with a scanning electron microscope for magnetic domain observation, and a width of the linear thermal strain is 10 μm or more and 300 μm or less, and
   in the base steel sheet, an orientation distribution angle γ around a rolling direction axis of secondary recrystallization grains, an orientation distribution angle α around an axis parallel to a normal direction, and an orientation distribution angle β around an axis perpendicular to each of the RD axis and the ND axis in units of ° satisfy the following Formulas (2) and (3), $$0.00 < (F1 - F2)/F2 \leq 0.15 \quad \text{Formula (1)}$$

$$1.0 \leq \gamma \leq 8.0 \quad \text{Formula (2)}$$

$$0.0 \leq (\alpha^2 + \beta^2)^{0.5} \leq 10.0 \quad \text{Formula (3).}$$

2. The grain-oriented electrical steel sheet according to claim 1,
   wherein the angle φ in units of ° satisfies the following Formula (4), $$0.0 \leq |\varphi| \leq 20.0 \quad \text{Formula (4).}$$

3. The grain-oriented electrical steel sheet according to claim 1,
   wherein the interval between the adjacent linear thermal strains in the rolling direction is 2.0 mm or more and 10.0 mm or less.

4. The grain-oriented electrical steel sheet according to claim 1,
   wherein a sheet thickness of the base steel sheet is 0.17 mm or more and 0.22 mm or less.

5. The grain-oriented electrical steel sheet according to claim 1,
   wherein the base steel sheet contains, in the chemical composition, by mass %, one or more selected from
   Bi: 0.001% to 0.020%,
   Sn: 0.005% to 0.500%,
   Cr: 0.01% to 0.500%, and
   Cu: 0.01% to 1.000%.

6. The grain-oriented electrical steel sheet according to claim 2,
wherein the interval between adjacent linear thermal strains in the rolling direction is 2.0 mm or more and 10.0 mm or less.

7. A method for producing the grain-oriented electrical steel sheet according to claim 1, comprising:
a hot rolling step of heating a steel piece and thereafter hot-rolling the steel piece to obtain a hot-rolled steel sheet, the steel piece including, as a chemical composition, by mass,
C: 0.010% to 0.200%,
Si: 2.50% to 4.00%,
Sol. Al: 0.010% to 0.070%,
Mn: 0.010% to 0.500%,
N: 0.020% or less,
P: 0.0300% or less,
S: 0.005% to 0.080%,
Bi: 0% to 0.020%,
Sn: 0% to 0.500%,
Cr: 0% to 0.500%,
Cu: 0% to 1.000%,
Se: 0% to 0.080%,
Sb: 0% to 0.50%, and
a remainder of Fe and impurities;
a hot-rolled sheet annealing step of annealing the hot-rolled steel sheet to obtain a hot-rolled and annealed steel sheet;
a cold rolling step of performing one cold rolling or a plurality of cold rollings with intermediate annealing therebetween on the hot-rolled and annealed steel sheet, to obtain a cold-rolled steel sheet;
a decarburization annealing step of performing decarburization annealing on the cold-rolled steel sheet to obtain a decarburization-annealed steel sheet;
a final annealing step of applying an annealing separating agent to the decarburization-annealed steel sheet and thereafter performing final annealing;
an insulation coating forming step of forming a tension-applying insulation coating on a surface of the steel sheet after the final annealing; and
a magnetic domain refining step of introducing linear thermal strains into a surface of the tension-applying insulation coating by a laser beam or an electron beam, wherein, the linear thermal strains are periodically introduced at predetermined intervals along the rolling direction so as to form a predetermined angle φ with respect to the transverse direction that is a direction orthogonal to the rolling direction,
wherein, in the decarburization annealing step, a temperature rising rate S0 in units of ° C./sec in a temperature range of 600° C. or higher and 800° C. or lower and an oxygen potential P0 satisfy the following Formulas (5) and (6),
a soaking step of the decarburization annealing step includes
a first soaking step of performing holding in an atmosphere having an oxygen potential P2 of 0.20 to 1.00 at a temperature T2° C. of 700° C. or higher and 900° C. or lower for a time of 10 seconds or longer and 1000 seconds or shorter, and
a second soaking step, performed subsequently to the first soaking step, of performing holding in an atmosphere of an oxygen potential P3 that satisfies the following Formula (10) at a temperature T3° C. that satisfies the following Formula (11) for a time of 5 seconds or longer and 500 seconds or shorter, and
an average irradiation energy density Ua in units of mJ/mm² of the laser beam or the electron beam in the magnetic domain refining step satisfies the following Formula (7), $400 \leq S0 \leq 2500$ \hfill Formula (5)

$0.0001 \leq P0 \leq 0.10$ \hfill Formula (6)

$1.0 \leq Ua \leq 5.0$ \hfill Formula (7)

$P3 < P2$ \hfill Formula (10)

$T2+50 \leq T3 \leq 1000$ \hfill Formula (11)

wherein the average irradiation energy density Ua is defined as Ua=PW/(Vc×PL), wherein PW is a beam power in units of W of the laser beam or the electron beam, Vc is a scanning speed in units of m/s of the laser beam or the electron beam in a transverse direction, and PL is beam irradiation interval PL in units of mm in a rolling direction, and
wherein oxygen potentials P0, P2 and P3 are defined as a ratio $P_{H2O}/P_{H2}$, wherein $P_{H2O}$ and $P_{H2}$ represent partial pressures of water vapor and hydrogen in an atmosphere.

8. The method for producing the grain-oriented electrical steel sheet according to claim 7,
wherein the angle φ in units of ° satisfies the following Formula (4), $0 \leq |\varphi| \leq 20.0$ \hfill Formula (4).

9. The method for producing the grain-oriented electrical steel sheet according to claim 7,
wherein, in the magnetic domain refining step, the laser beam or the electron beam is irradiated wherein an interval between linear thermal strains adjacent to each other in the rolling direction is 2.0 mm or more and 10.0 mm or less.

10. The method for producing the grain-oriented electrical steel sheet according to claim 7,
wherein, in a temperature raising step of the decarburization annealing step, a temperature rising rate S1 in units of ° C./sec in a temperature range of 500° C. or higher and lower than 600° C. and an oxygen potential P1 satisfy the following Formulas (8) and (9), $300 \leq S1 \leq 1500$ \hfill Formula (8)

$0.0001 \leq P1 \leq 0.50$ \hfill Formula (9), wherein oxygen potential P1 is defined as a ratio $P_{H2O}/P_{H2}$, wherein $P_{H2O}$ and $P_{H2}$ represent partial pressures of water vapor and hydrogen in an atmosphere.

11. The method for producing the grain-oriented electrical steel sheet according to claim 7,
wherein a sheet thickness of the cold-rolled steel sheet is 0.17 mm or more and 0.22 mm or less.

12. The method for producing the grain-oriented electrical steel sheet according to claim 7,
wherein, the steel piece contains, in the chemical composition, by mass %, one or more selected from
Bi: 0.001% to 0.020%,
Sn: 0.005% to 0.500%,
Cr: 0.01% to 0.500%, and
Cu: 0.01% to 1.000%.

* * * * *